(12) United States Patent
Kawada et al.

(10) Patent No.: US 8,589,646 B2
(45) Date of Patent: Nov. 19, 2013

(54) STORAGE APPARATUS AND METHOD FOR STORAGE APPARATUS

(75) Inventors: Takashi Kawada, Kawasaki (JP); Yoshinari Shinozaki, Kawasaki (JP); Hidenori Yamada, Kawasaki (JP); Koji Uchida, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 12/900,831

(22) Filed: Oct. 8, 2010

(65) Prior Publication Data

US 2011/0087850 A1    Apr. 14, 2011

(30) Foreign Application Priority Data

Oct. 13, 2009   (JP) .................................. 2009-236551

(51) Int. Cl.
*G06F 12/00*    (2006.01)

(52) U.S. Cl.
USPC ........... 711/162; 711/113; 711/118; 711/154; 711/161

(58) Field of Classification Search
USPC .......................... 711/113, 118, 154, 161, 162
See application file for complete search history.

(56) References Cited

U.S. PATENT DOCUMENTS

| | | | |
|---|---|---|---|
| 7,430,637 B2 | 9/2008 | Mikami | |
| 7,971,011 B2 | 6/2011 | Furukawa et al. | |
| 2006/0015699 A1* | 1/2006 | Fujiwara et al. | 711/162 |
| 2007/0192555 A1* | 8/2007 | Arakawa et al. | 711/162 |

FOREIGN PATENT DOCUMENTS

| | | |
|---|---|---|
| JP | 07-193664 | 7/1995 |
| JP | 2002-024167 | 1/2002 |
| JP | 2006-155202 A | 6/2006 |
| JP | 2006-260292 | 9/2006 |
| JP | 2006-260355 | 9/2006 |
| JP | 2006-268420 A | 10/2006 |

OTHER PUBLICATIONS

"Japanese Office Action" mailed by JPO and corresponding to Japanese application No. 2009-236551 on Mar. 5, 2013, with English translation.

* cited by examiner

*Primary Examiner* — Midys Rojas
(74) *Attorney, Agent, or Firm* — Fujitsu Patent Center

(57) ABSTRACT

A storage apparatus includes a storage module, a memory having areas storing data to be copied to the storage device, a saving buffer for temporarily saving the data stored in the areas, a control module for executing receiving a write request including the data to be stored in the storage apparatus, storing the data included in the write request to the storage module and one area, saving the data stored in the one area to the saving buffer when the number of areas which the copying is executed is not less than the threshold value, copying the data stored in the one area to the storage device or writing the saved data stored in the saving buffer to the one area when the number of areas which the copying is executed is less than the threshold value, determining the threshold value in accordance with an amount of the write request.

16 Claims, 29 Drawing Sheets

FIG. 3

| | | 300 |
|---|---|---|
| SUBJECT BUFFER SET ID | 0006 | |
| WRITE BACK POINTER INFORMATION | GENERATION 15 | |
| STAGE POINTER INFORMATION | GENERATION 2 | |
| BUFFER THRESHOLD | 4 | |
| ... | ... | |

| BUFFER SET ID | PURPOSE OF USE | SUBJECT GENERATION | STORED NUMBER OF I/O |
|---|---|---|---|
| 0000 | STAGING | 3 | 1000 |
| 0001 | STAGING | 4 | 1000 |
| 0002 | STAGING | 5 | 1000 |
| 0003 | STAGING | 6 | 800 |
| 0004 | WRITING BACK | 13 | 600 |
| 0005 | WRITING BACK | 14 | 400 |
| 0006 | STORING | 15 | 100 |
| 0007 | — | — | — |

| MAX NUMBER OF GENERATIONS | SAVE POSITION | |
|---|---|---|
| | CONTROL MODULE | LEADING ADDRESS |
| 10000 | #00 | 0X00000 |
| | #01 | 0X10000 |
| | #02 | 0X20000 |
| | ... | ... |

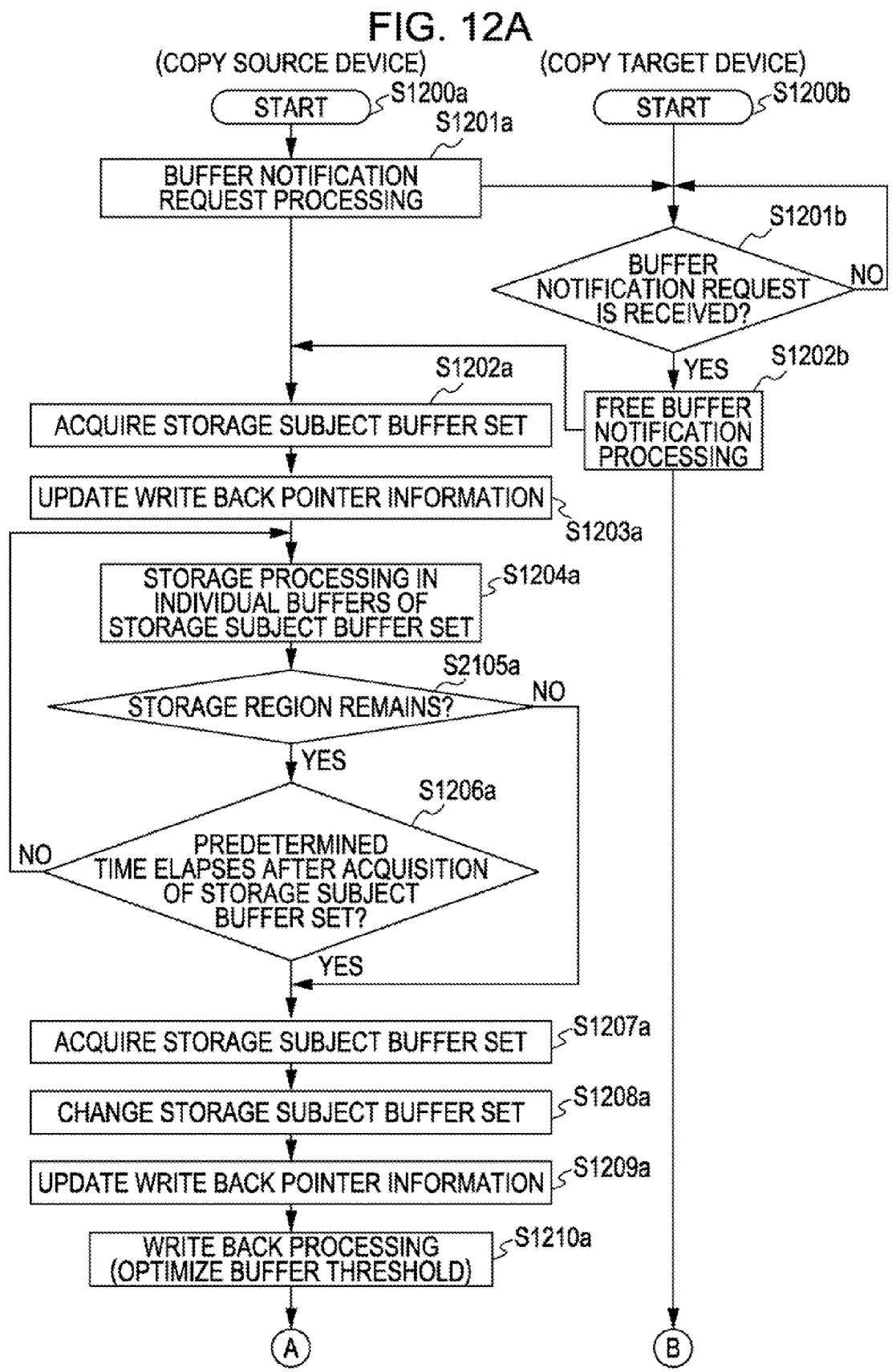

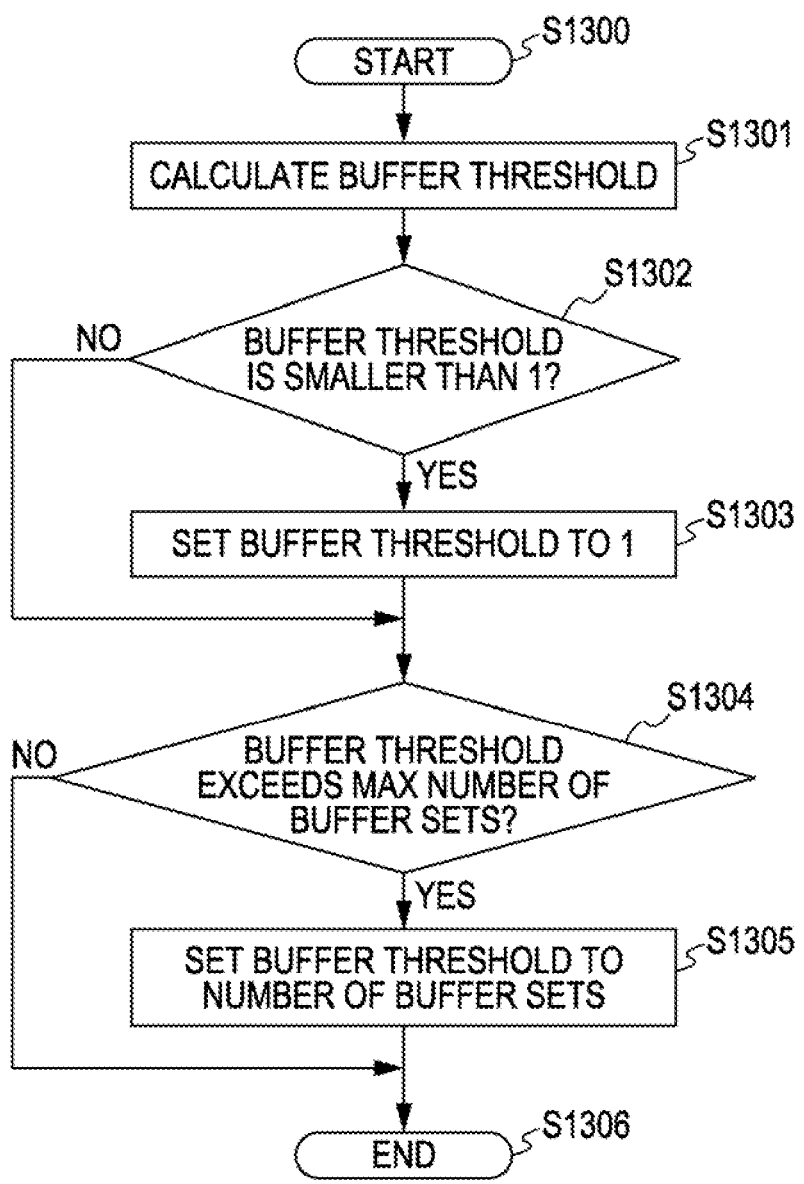

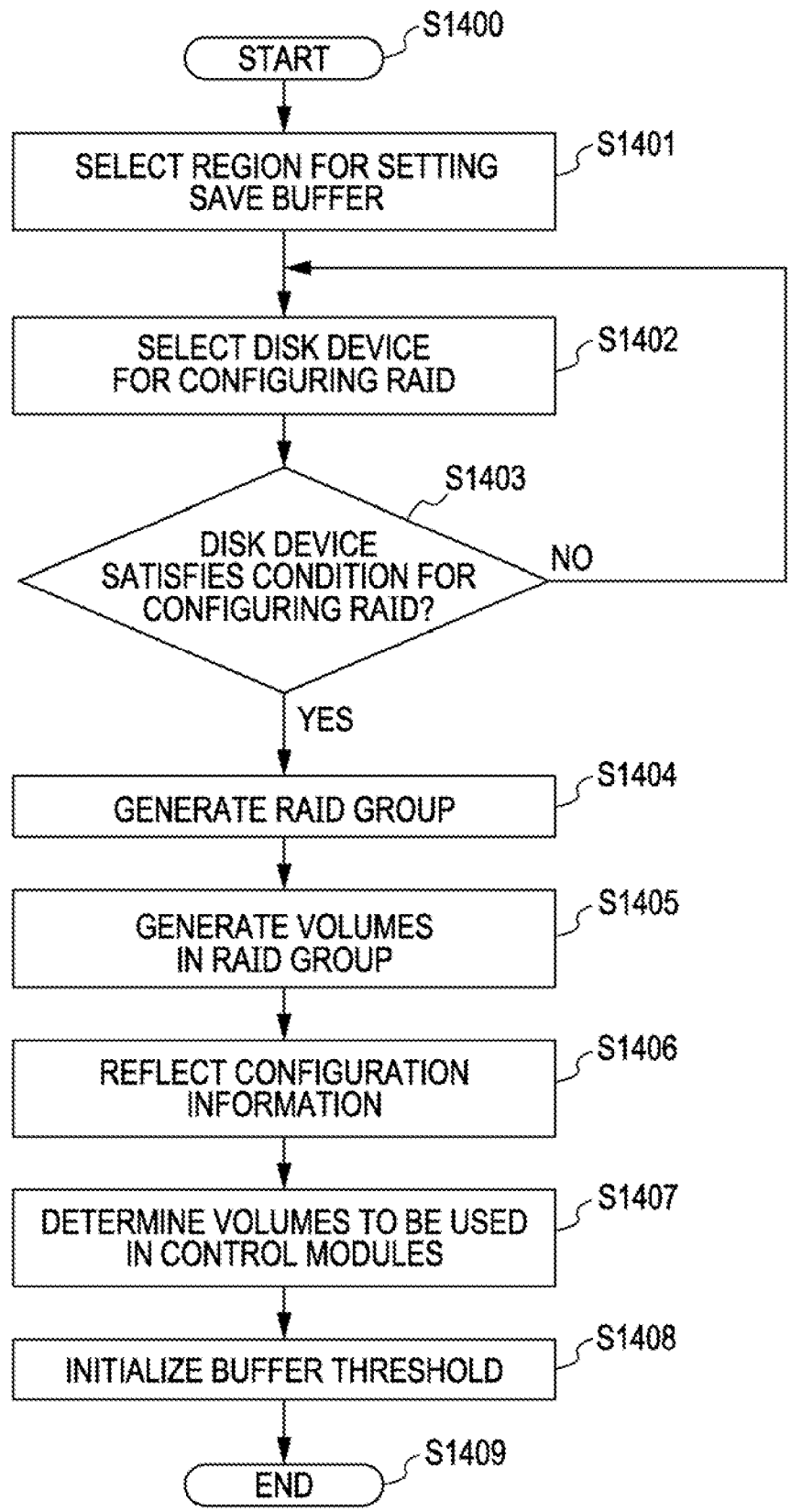

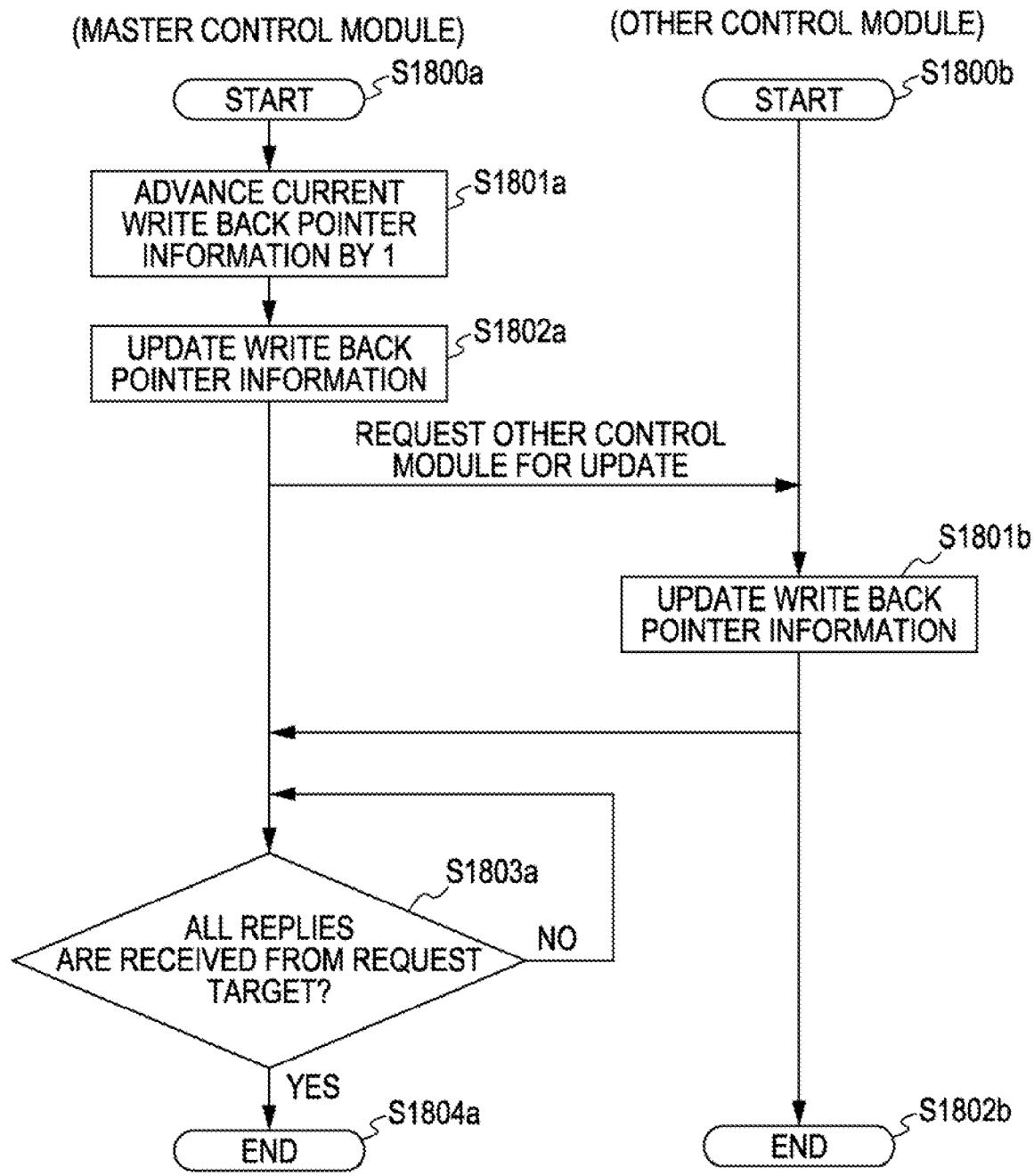

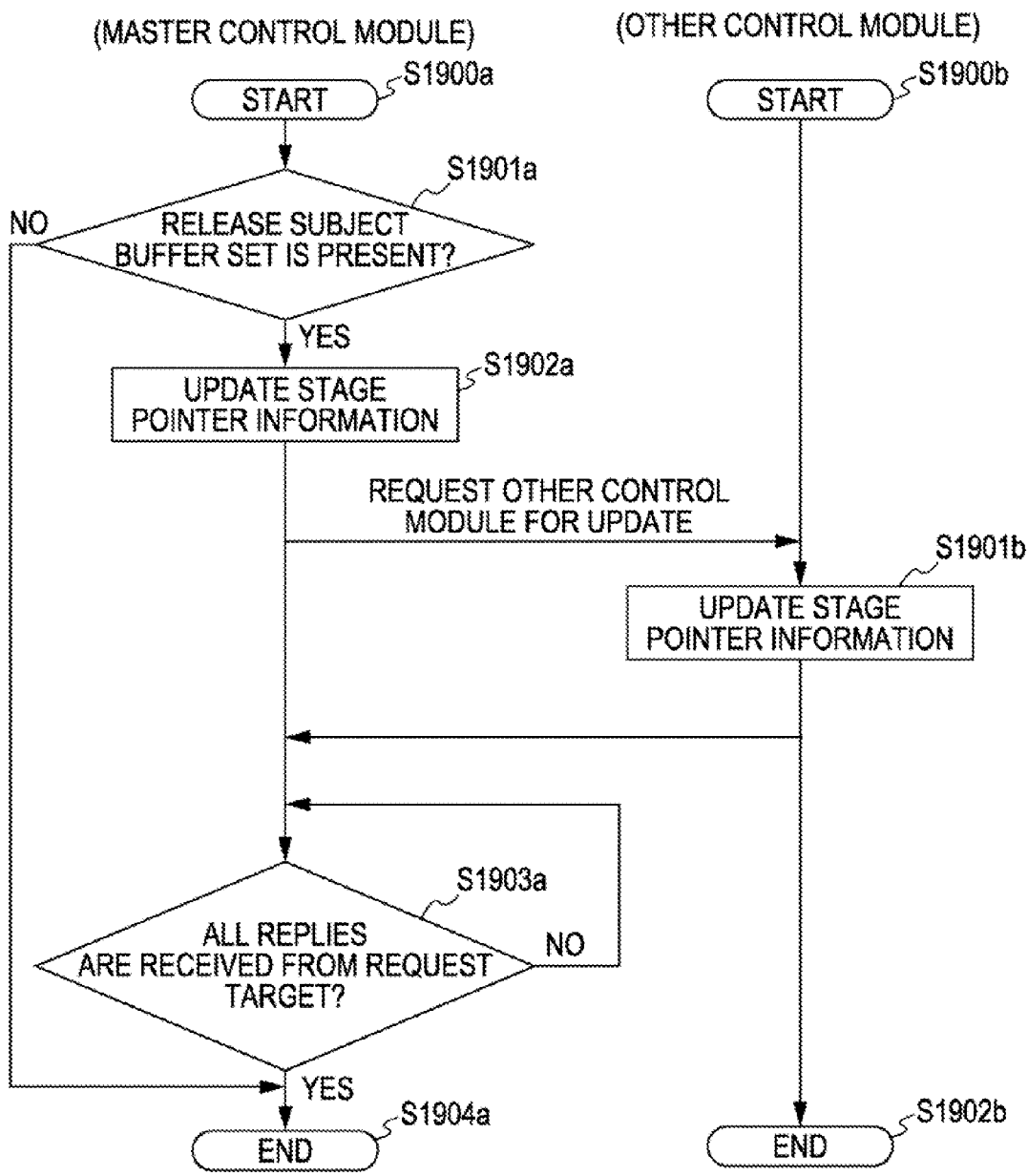

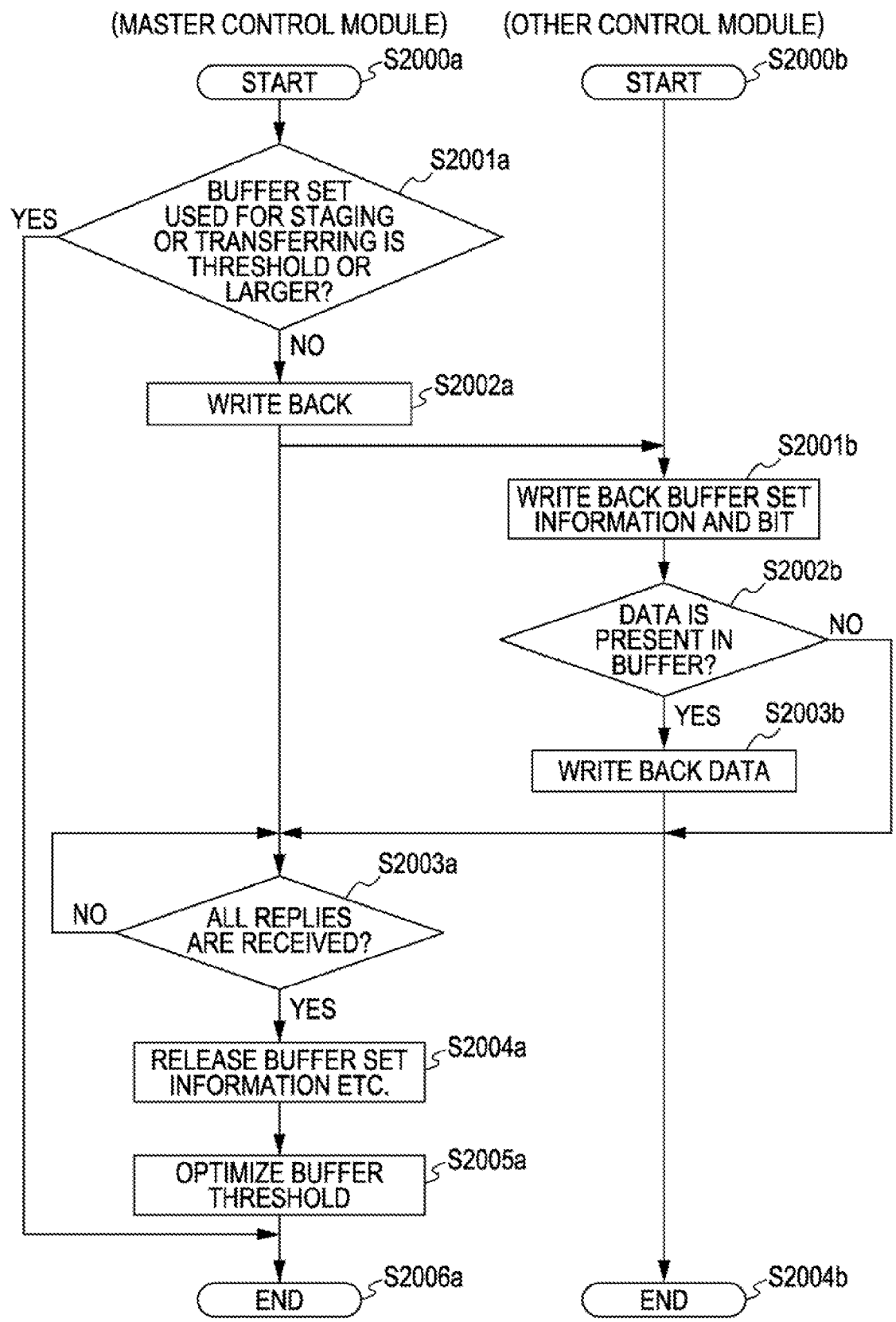

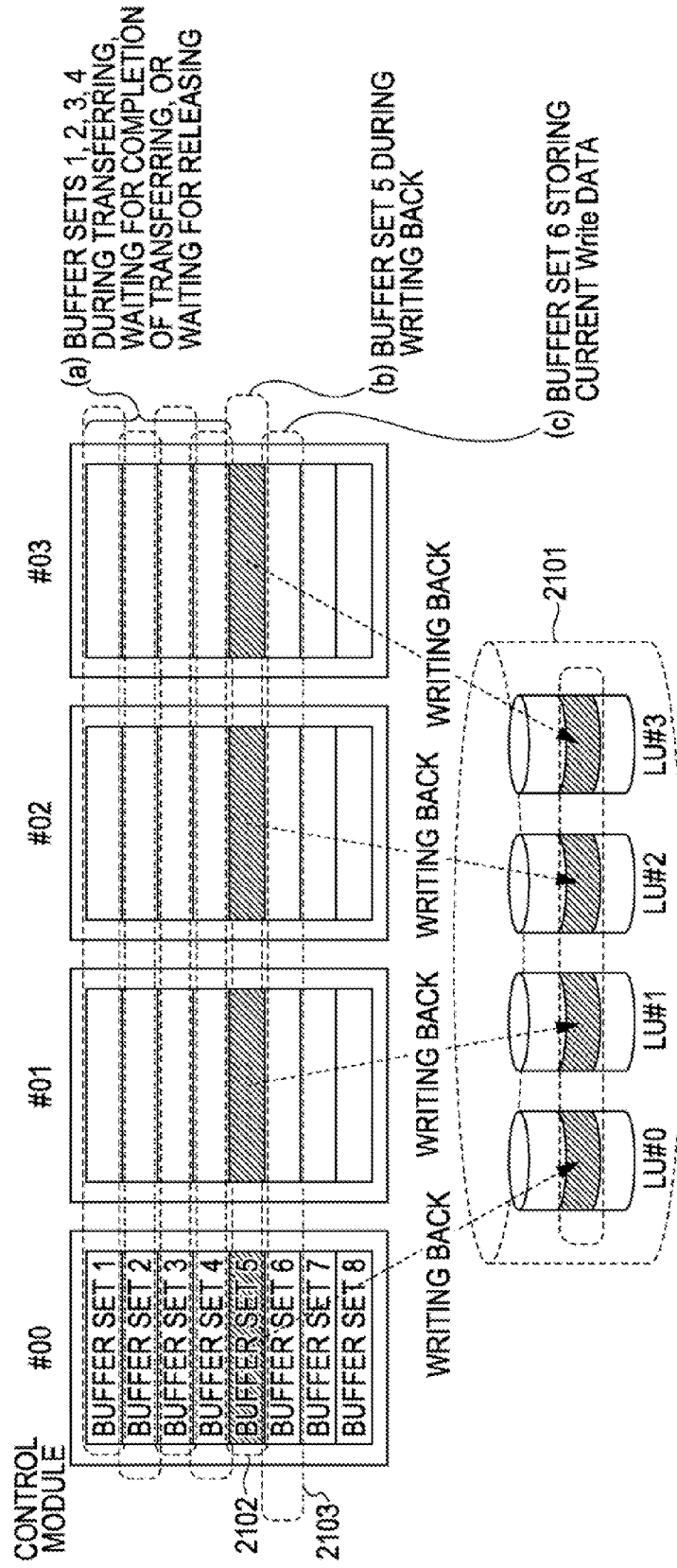

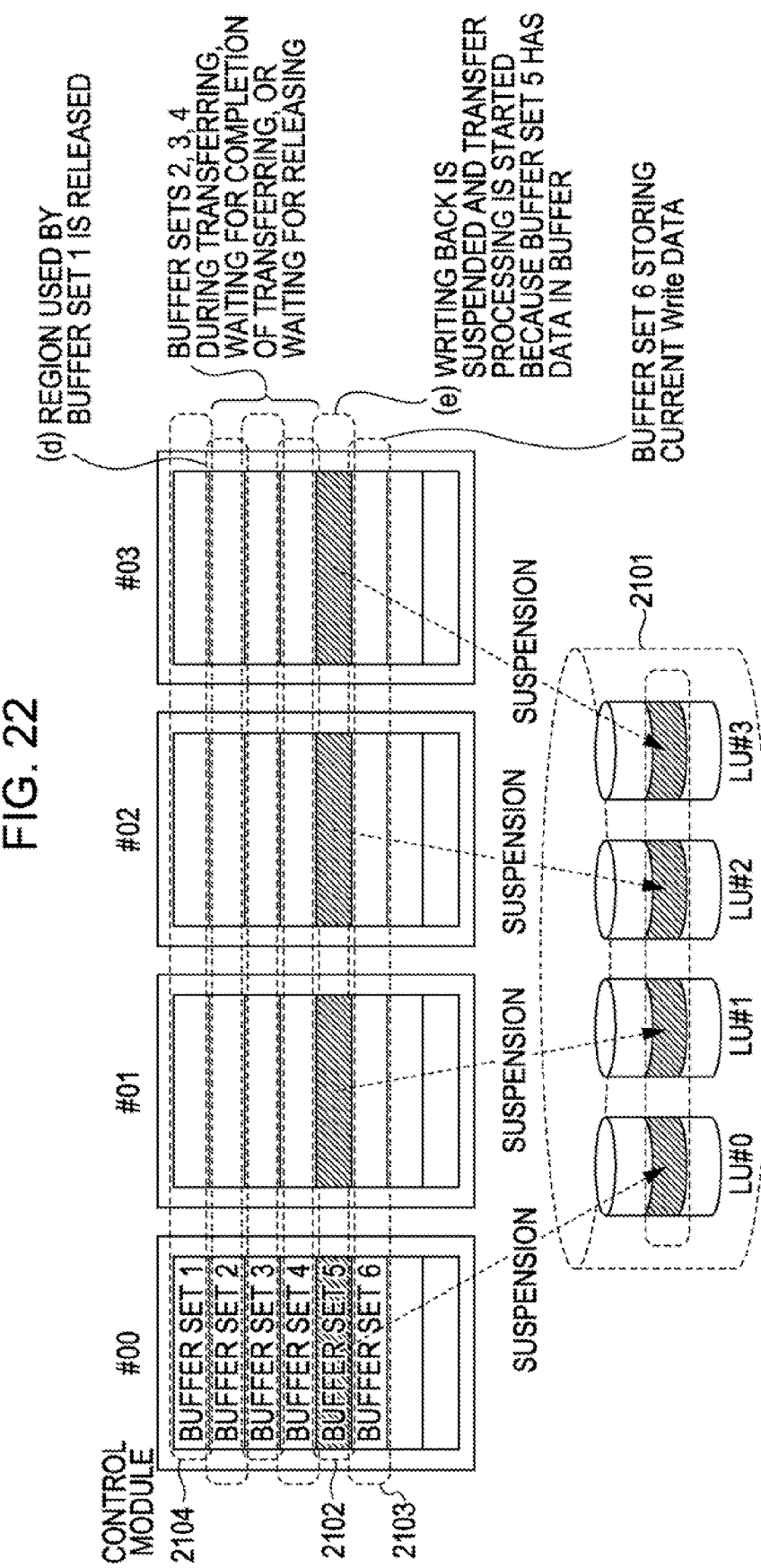

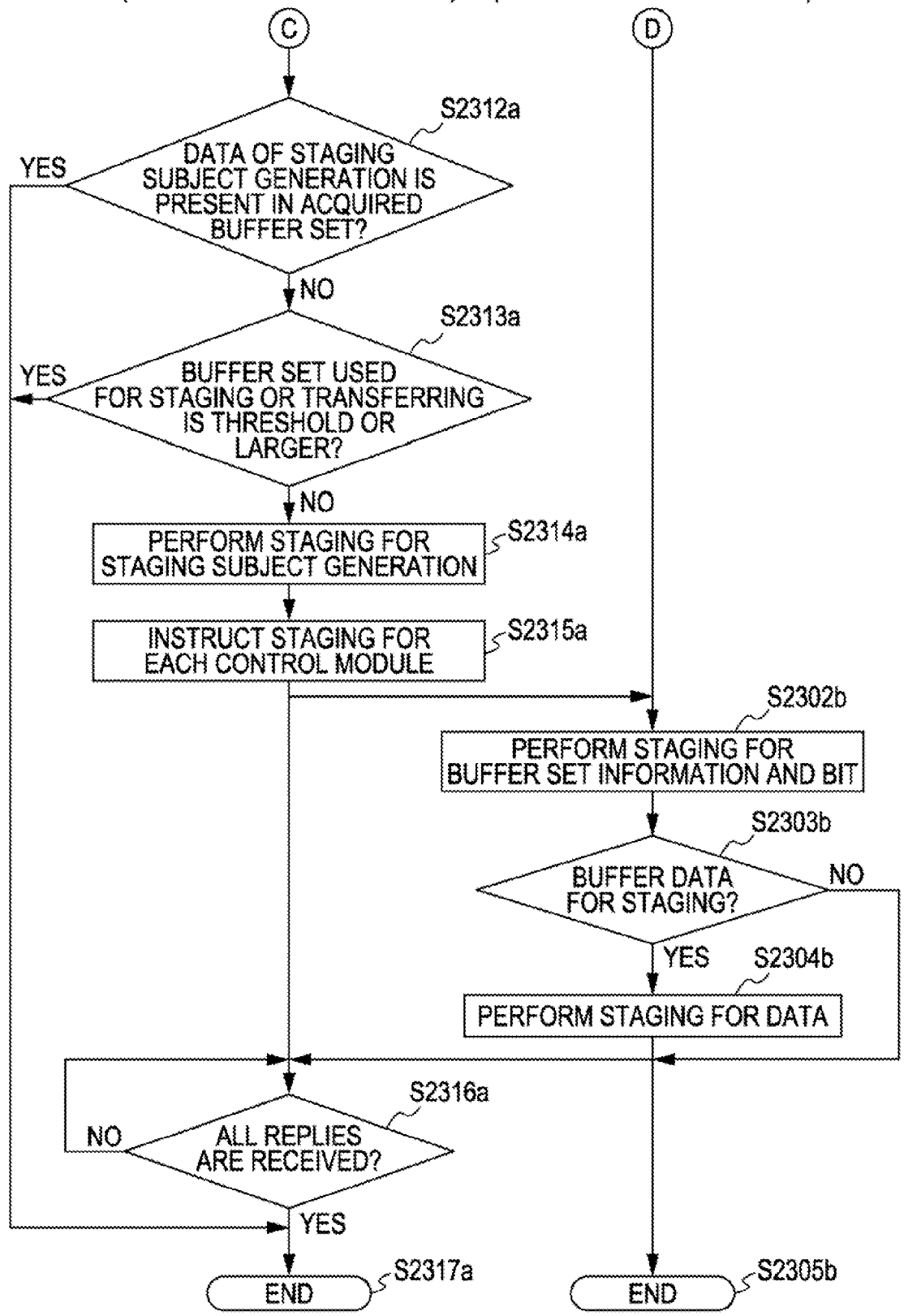

STORAGE APPARATUS AND METHOD FOR STORAGE APPARATUS

CROSS-REFERENCE TO RELATED APPLICATION

This application is based upon and claims the benefit of priority of the prior Japanese Patent Application No. 2009-236551, filed on Oct. 13, 2009 the entire contents of which are incorporated herein by reference.

FIELD

The embodiment discussed herein is related to a storage apparatus and a control method for the storage apparatus.

BACKGROUND

An apparatus of redundant arrays of inexpensive disks, or a RAID apparatus uses a storage system of distributed cache memory type. The RAID apparatus conventionally uses a redundant configuration including a plurality of control modules that control input and output of data to and from a storage for increasing performance and reliability. Read/write processing of data is executed by each control module from/in a logical volume.

Such a RAID apparatus has a remote copy function that ensures ordering, the function which is so-called advanced copy, for increasing the reliability etc.

FIG. 28 is an illustration explaining the RAID apparatus having the remote copy function that ensures the ordering. FIG. 28 illustrates a storage system including a RAID apparatus (a copy source apparatus) 2801 having control modules #00 and #01, and a RAID apparatus (a copy target apparatus) 2802 having control modules #10 and #11.

Each of the control modules included in each of the RAID apparatuses includes a write only buffer having a buffer and a buffer index table (BIT) storage unit; a buffer set information storage unit that stores information relating to a buffer set; and a storage medium that stores data.

The buffer is divided into a plurality of regions each having a given size. Buffer IDs are respectively assigned to the divided regions. Data stored in the storage medium or data to be stored in the storage medium is temporarily stored in the respective regions. The BIT storage unit stores storage locations of data stored in the buffer, or a BIT that is information including buffer IDs in FIG. 28.

Referring to FIG. 28, (0000) written in a buffer represents buffer data stored in a buffer with a buffer ID of 0000. Also, 0000 written in the BIT represents the buffer ID.

The buffer set information storage unit stores information relating to a buffer set that is a combination of buffer data stored in the buffers of the control modules, for example, a combination of buffer data (0000) and (0100) surrounded by a circle with a horizontally extending dotted line in the copy source apparatus 2801.

The information relating to the buffer set includes association information that associates each buffer data with a buffer in the copy target apparatus 2802 that stores the buffer data. For example, the buffer data stored in the buffer with the buffer ID of 0000 is associated with a buffer with a buffer ID of 1000 that stores the buffer data, in the buffer set information storage unit in the control module #00.

In the above configuration, (a) the control modules #00 and #01 store Write data in storage media in response to a Write I/O command from a host computer or the like.

Simultaneously, (b) the control modules #00 and #01 transfer and store the Write data in the buffers. At this time, the Write data is managed on a buffer set-by-buffer set basis.

Then, (c) when writing the Write data in the buffers is completed, the control modules #00 and #01 start data transfer for the Write data, i.e., start remote copy on buffer set-by-buffer set basis.

(d) The write data sent from the copy source apparatus 2801 by the remote copy is stored in the buffers included in the control modules #10 and #11 in the copy target apparatus 2802 in accordance with the buffer set information. Then, the control modules #10 and #11 reflect the Write data stored in the buffers into the storage media.

When the above processing is completed, (e) the control modules in the copy source apparatus 2801 and the copy target apparatus 2802 release the buffers etc.

As described above, the buffer set is collectively controlled by performing the data transmission, collectively by using the write only buffer. Then in the copy target apparatus 2802, the data is expanded in the storage media on buffer set-by-buffer set basis. Accordingly, the ordering is ensured.

Relating to the technique, a backup device is known. The backup device monitors the use states of the buffers that temporarily store the write data, writes out the information in the buffers to a high-speed disk system if free spaces of the buffers become small, and writes back the information to the buffers if the use states of the buffers are improved.

Also, a cache storage system is known. The cache storage system includes a cache disk that temporarily stores copy data to be transmitted by a master storage system, and copy data transmitting means for transmitting the copy data stored in the cache disk and storing the copy data in a sub-storage system.

Japanese Laid-open Patent Publication Nos. 2006-268420 and 2006-155202 are examples of related art.

Referring to FIG. 29, in the copy source apparatus 2801, however, the buffers that store the transferred Write data, and the BIT storage unit are not released and held until the Write data is expanded into the storage media in the copy target apparatus 2802.

Thus, (f) in a case in which the processing for expanding the Write data into the storage media is delayed in the copy target apparatus 2802, if line performance between the copy source apparatus 2801 and the copy target apparatus 2802 is low or unstable, the transfer processing may be delayed.

For example, if the transfer processing is delayed because a line bandwidth between the copy source apparatus 2801 and the copy target apparatus 2802 is low or unstable, the time of using the buffers and the BIT storage units in the copy source apparatus 2801 and the copy target apparatus 2802 may increase due to the delay. Thus, the memory cannot be released during that time.

(g) In this state, the copy source apparatus 2801 stores Write data every time when the copy source apparatus 2801 receives a new Write I/O command from the host computer or the like. Consequently, the buffers in the copy source apparatus 2801 are consumed one after another.

(h) If this state continues, the buffers capable of storing the Write data may be insufficient, and shortage of a buffer in the copy source apparatus 2801 may occur. Also, if the Write data has a size equivalent to or larger than the assigned buffer, the shortage of a buffer may occur.

In the state in which the buffer is used up, the copy source apparatus 2801 stops without processing the Write I/O command from the host computer or the like. This state cannot be continued for a long time.

Hence, (i) the processing of the Write I/O command is temporarily stopped, and if the state in which the buffer is used up is not settled although a predetermined time elapses, buffer Halt processing is performed. The copy source apparatus 2801 and the copy target apparatus 2802 perform the buffer Halt processing, to clear the buffer and resume the processing of the Write I/O command.

At this time, the copy source apparatus 2801 writes back the information of the Write data etc. in the buffer into a dedicated bit map. The copy source apparatus 2801 performs remote copy transfer that does not ensure the ordering, in accordance with the bit map after the buffer Halt processing is executed. In this case, the remote copy that ensures the ordering may be suspended.

SUMMARY

According to an aspect of the invention, a storage apparatus connected to a storage device includes a storage module, a memory having a plurality of areas for storing data to be copied to the storage device, a saving buffer for temporarily saving the data stored in the plurality of areas, a control module for executing, receiving a write request including the data to be stored in the storage apparatus from an external device, storing the data included in the write request to the storage module, storing the data included in the write request to one of the plurality of areas, copying the data stored in the one of the plurality of areas to the storage device when the number of areas which the copying is executed is less than a threshold value, saving the data stored in the one of the plurality of areas to the saving buffer when the number of areas which the copying is executed is not less than the threshold value, writing the saved data stored in the saving buffer to the one of the plurality of areas when the number of areas which the copying is executed is less than the threshold value, determining the threshold value in accordance with an amount of the write request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary configuration of a buffer management table.

FIG. 4 illustrates an exemplary configuration of a buffer set management table.

FIG. 5 illustrates an exemplary configuration of a save buffer management table.

FIG. 12A is a flowchart briefly illustrating remote copy.

FIG. 13 is a flowchart illustrating processing for initializing a buffer threshold.

FIG. 14 is a flowchart illustrating processing for generating a region of the save buffer.

FIG. 18 is a flowchart illustrating update processing for the write back pointer information.

FIG. 19 is a flowchart illustrating update processing for the stage pointer information.

FIG. 20 is a flowchart illustrating writing back.

FIG. 21 illustrates a specific example of writing back.

FIG. 22 illustrates a specific example of writing back.

FIG. 23B is a flowchart illustrating staging.

DESCRIPTION OF EMBODIMENTS

Examples of this embodiment will be described below with reference to FIGS. 1 to 27.

Figure 1:
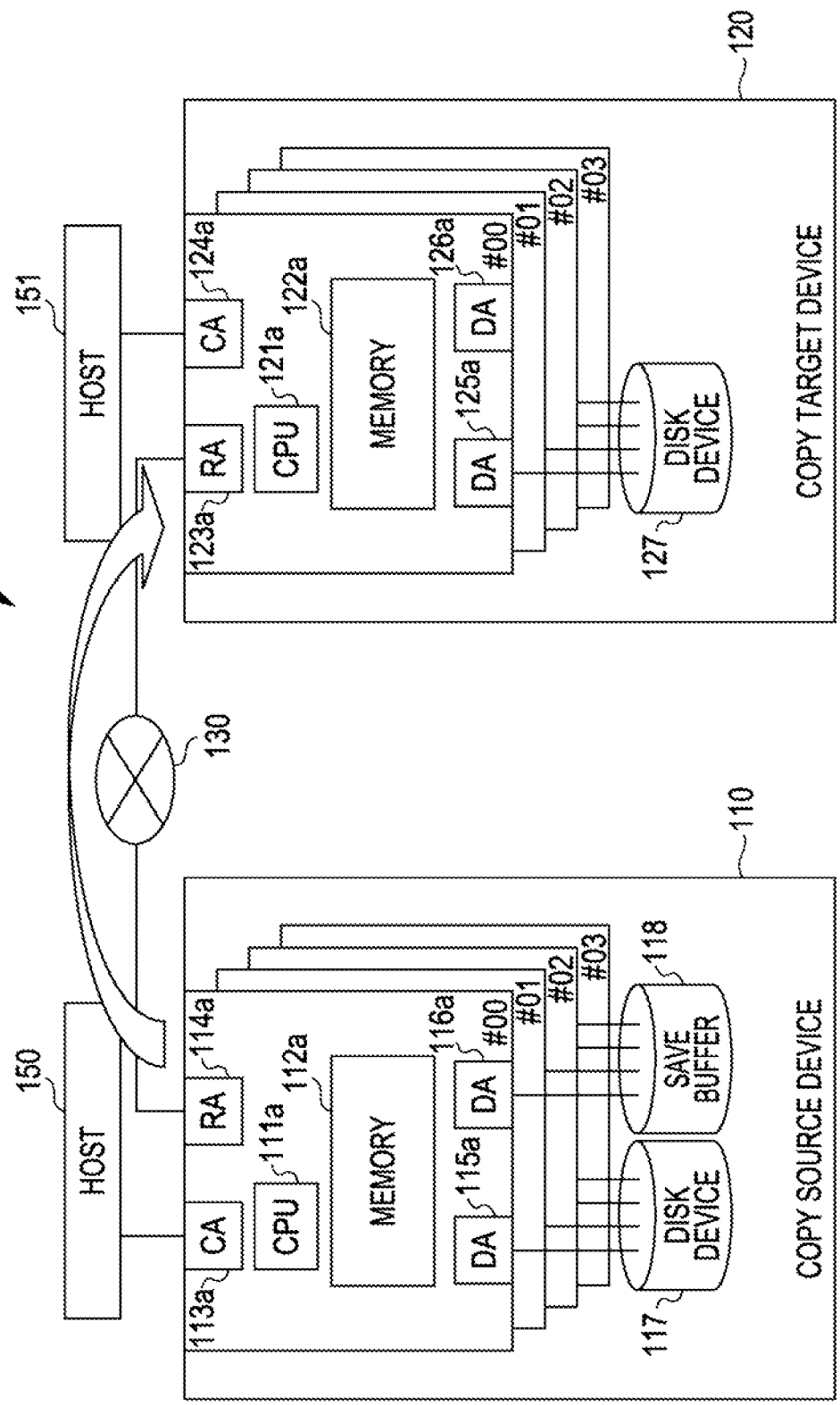
FIG. 1 briefly illustrates a configuration of a storage system.

FIG. 1 briefly illustrates a configuration of a storage system 100 according to this embodiment.

The storage system 100 illustrated in FIG. 1 includes a RAID apparatus 110 and a RAID apparatus 120 connected to the RAID apparatus 110 through a network or a dedicated line 130 such that communication is allowed therebetween.

The RAID apparatus 110 is a RAID apparatus of distributed cache memory type that includes control modules #00 to #03 that have memories used for cache memories etc., a disk device (storage module) 117 having a storing device such as a magnetic disk device, and a save buffer 118.

The control modules #00 to #03 are connected with the disk device 117 and the save buffer 118.

The control module #00 includes a central processing unit (CPU) 111a, a memory 112a, a channel adapter (CA) 113a, a remote adapter (RA) 114a, and device adapters (DAs) 115a and 116a.

The CPU 111a executes a predetermined program command, causes the control module #00 to operate, and hence actualizes remote copy that ensures ordering according to this embodiment.

The memory 112a is used not only for the cache memory but also for a write only buffer 201 and a buffer set information storage unit 202 (described later).

The CA 113a is an interface control unit for a host 150 that is a host computer connected with the RAID apparatus 110. The RA 114a is an interface control unit for another RAID apparatus connected therewith through the network or the dedicated line 130.

The DAs 115a and 116a are interface control units for the disk device 117 and the save buffer 118. In this embodiment, the DA 115a is connected with the disk device 117, and the DA 116a is connected with the save buffer 118.

The other control modules #01 to #03 in the RAID apparatus 110 and control modules #00 to #03 in the RAID apparatus 120 have configurations similar to the control module #00 in the RAID apparatus 110. However, the RAID apparatus 120 (serving as a copy target apparatus (storage device), described later) does not have to include a save buffer.

In the above configuration, for example, "save processing means," "data group output means," "storage processing means," and "adjusting means" may be actualized if the CPU 111a executes program commands expanded in a predetermined region in the memory 112a.

A "data group" may be actualized by using buffer set data.

"First storage means" may be actualized by using part of or the entire disk device 117 including one or two or more magnetic disk devices etc. "Data group storage means" may be actualized by using part of or the entire save buffer 118.

"Second storage means" may be actualized by using a partial region of the memory 112a.

The RAID apparatuses 110 and 120 each have the four control modules #00 to #03 in FIG. 1. However, it is not limited thereto. The RAID apparatuses 110 and 120 are only required to be RAID apparatuses of distributed cache memory type. The numbers of the CPUs, CAs, RAs, and DAs are not limited to those numbers illustrated in FIG. 1.

In the following embodiment, a case will be described in which remote copy is performed from the RAID apparatus 110 to the RAID apparatus 120. In this case, the RAID apparatus 110 (storage apparatus) is called "copy source apparatus 110," and the RAID apparatus 120 is called "copy target apparatus 120."

Figure 2:
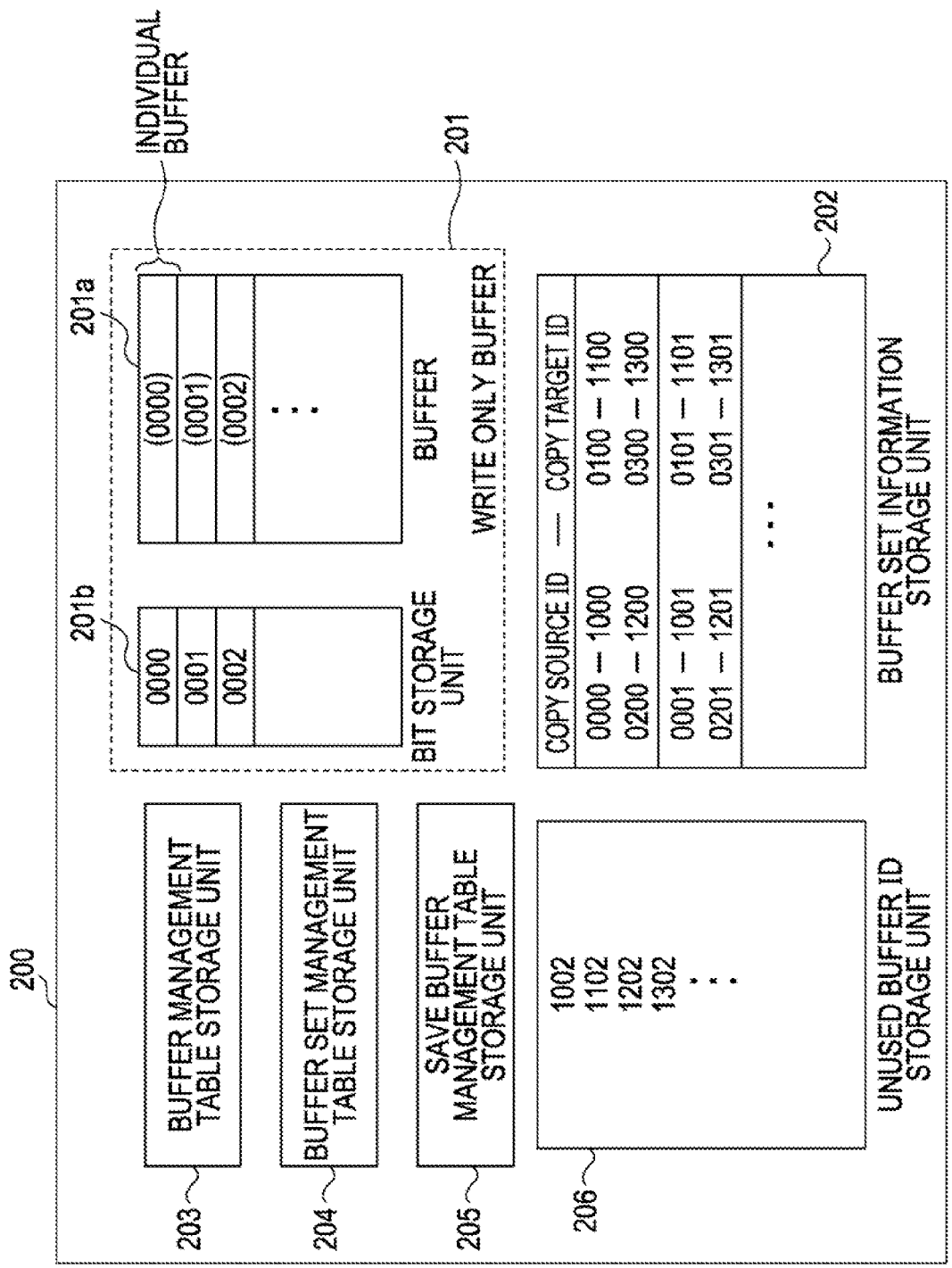
FIG. 2 illustrates an exemplary specific configuration of a memory included in a control module.

FIG. 2 illustrates an exemplary specific configuration of a memory 200 included in a control module according to this embodiment, more specifically, the memory 112a included in the control module #00 in the RAID apparatus 110 illustrated in FIG. 1.

Memories 112b, 112c, and 112d in the control modules #01 to #03 in the RAID apparatus 110 and memories 122a, 122b, 122c, and 122d included in the control modules #00 to #03 in the RAID apparatus 120 may have a configuration similar to that illustrated in FIG. 2.

The memory 200 illustrated in FIG. 2 includes a write only buffer 201 and a buffer set information storage unit 202. The memory 200 also includes a buffer management table storage unit 203, a buffer set management table storage unit 204, a save buffer management table storage unit 205, and an unused buffer ID storage unit 206.

The write only buffer 201 includes a buffer 201a and a BIT storage unit 201b.

The buffer 201a temporarily stores data to be stored in the disk device 117 or data stored in the disk device 117 such as Write data (described later). The buffer 201a according to this embodiment is divided into 8 regions each having a given size. Specific identification information is assigned to each of the divided regions. The buffer 201a is divided into the 8 regions in this embodiment; however, the configuration is not limited to that the buffer 201a is divided into the 8 regions.

Hereinafter, the divided regions are called "individual buffers." The identification information assigned to each individual buffer is called "buffer ID." Data stored in an individual buffer indicated by a certain buffer ID is called "buffer data."

For example, regarding (0000), (0001), (0002) . . . written in the buffer 201a in FIG. 2, the numbers 0000, 0001, 0002 . . . provided in parentheses are buffer IDs respectively assigned to the individual buffers. The parenthetical numbers (0000), (0001), (0002) . . . are buffer data stored in the individual buffers indicated by the buffer IDs provided in parentheses.

The BIT storage unit 201b stores a BIT including a logical unit (LU) where buffer data stored in the individual buffer in the buffer 201a is expanded, a logical block address (LBA), a data size, the number of copy sessions, etc.

The numbers 0000, 0001, 0002 . . . written in the BIT storage unit 201b represent the buffer IDs assigned to the individual buffers in the buffer 201a. For example, the number 0000 in the BIT storage unit 201b stores a BIT including a LU where buffer data stored in the individual buffer with the buffer ID of 0000 is expanded, a LBA, a data size, the number of copy sessions, etc.

The buffer set information storage unit 202 stores identification information indicative of a combination of individual buffers to be used next in control modules in a single RAID apparatus. That is, the buffer set information storage unit 202 stores a buffer set ID (described later).

Hereinafter, a combination of individual buffers in control modules in a single RAID apparatus is called "buffer set." Identification information assigned to a buffer set is called "buffer set ID." Information relating to a buffer set is called "buffer set information." Buffer data stored in a buffer set is collectively called "buffer set data."

In this embodiment, the buffer 201a in each control module includes the 8 individual buffers, and hence the number of buffer sets is also 8. To simplify the description, it is assumed that a buffer set ID is equivalent to a buffer ID of an individual buffer in a master control module (described later).

The buffer set information also includes information that associates an individual buffer in a control module in the copy source apparatus 110 with an individual buffer in a control module in the copy target apparatus 120 when remote copy is performed between the RAID apparatuses. Processing for adding the association information to the buffer set information is called "matching processing."

Hereinafter, a buffer ID of an individual buffer in a control module in the copy source apparatus 110 is called "copy source ID." A buffer ID of an individual buffer in a control module in the copy target apparatus 120 is called "copy target ID."

For example, since the RAID apparatus 110 is the RAID apparatus of distributed cache memory type, data such as Write data is stored in individual buffers in each module, or particularly in an example illustrated in FIG. 2, data is distributed into individual buffers with buffer IDs of 0000, 0100, 0200, and 0300.

In this case, the buffer set information storage unit 202 stores buffer set information indicative of a buffer set including the individual buffers with the buffer IDs of 0000, 0100, 0200, and 0300.

The buffer set information includes combination information indicative of combinations of copy source IDs and copy target IDs, such as 0000 and 1000, 0100 and 1100, 0200 and 1200, and 0300 and 1300.

It is assumed that the buffer IDs 0000, 0100, 0200, and 0300 stored in the buffer set information storage unit 202 illustrated in FIG. 2 indicate individual buffers respectively included in the control modules #00, #01, #02, and #03 in the copy source apparatus 110.

Also, it is assumed that buffer IDs 1000, 1100, 1200, and 1300 stored in the buffer set information storage unit 202 illustrated in FIG. 2 indicate individual buffers respectively included in the control modules #00, #01, #02, and #03 in the copy target apparatus 120.

Remote copy according to this embodiment is performed on a buffer set-by-buffer set basis. Copy subject data in each buffer set includes a BIT and buffer data stored in the write only buffer 201, and buffer set information stored in the buffer set information storage unit 202.

Figure 8:
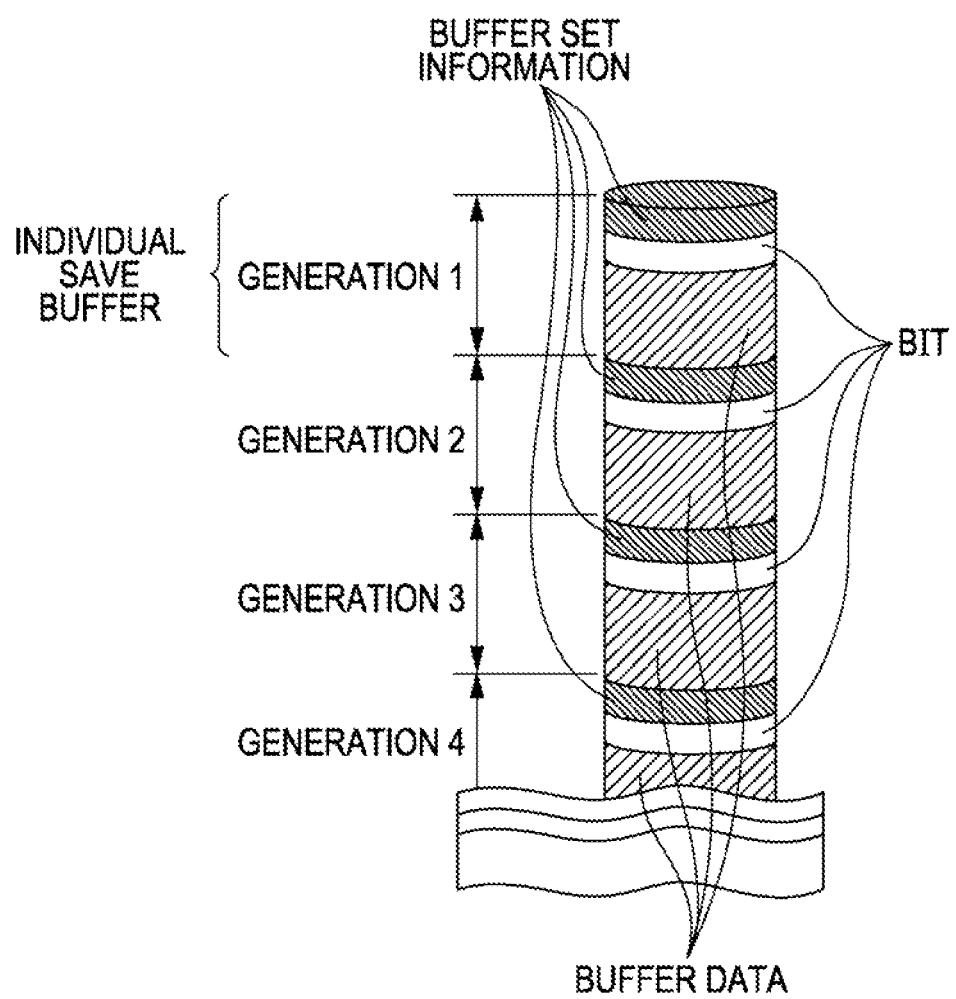
FIG. 8 is an illustration explaining the save buffer.

In this embodiment, the copy subject data in each buffer set is managed as a single "generation." A specific example of the generation is illustrated in FIG. 8.

The buffer management table storage unit 203 stores a buffer management table 300 used for management of, for example, the write only buffer 201. The buffer management table 300 will be described later.

The buffer set management table storage unit 204 stores a buffer set management table 400 used for management of use states of buffer sets. The buffer set management table 400 will be described later.

The save buffer management table storage unit 205 stores a save buffer management table 500 used for management of the save buffer 118. The save buffer management table 500 will be described later.

The unused buffer ID storage unit 206 stores buffer IDs of unused individual buffers in the copy target apparatus 120. Hereinafter, a buffer ID of an unused individual buffer is called "unused buffer ID." For example, when the copy source apparatus 110 receives notification of an unused buffer ID from the copy target apparatus 120, the copy source apparatus 110 stores the notified unused buffer ID in the unused buffer ID storage unit 206.

With the above configuration, in the remote copy according to this embodiment, the copy source apparatus 110 collectively performs processing for storing Write data in the write only buffer 201 and processing for transferring the Write data to the copy target apparatus 120 on a buffer set-by-buffer set basis.

Similarly, in the remote copy according to this embodiment, the copy target apparatus 120 collectively performs processing for expanding the Write data transferred from the copy source apparatus 110 into a disk device 127 on a buffer set-by-buffer set basis. Consequently, the remote copy that ensures ordering is actualized.

The remote copy that ensures the ordering by using the buffer set is a known technique. For example, Japanese Laid-open Patent Publication No. 2006-260292 discloses the technique.

FIG. 3 briefly illustrates an exemplary configuration of the buffer management table 300 according to this embodiment.

The buffer management table 300 includes a subject buffer set ID, write back pointer information, stage pointer information, and a buffer threshold.

The subject buffer set ID is information indicative of a buffer set ID of a buffer set that is currently used. The write back pointer information is information indicative of a generation subjected to writing back (described later). The stage pointer information is information indicative of a generation that staging is performed last. The buffer threshold is information used as a reference for determining whether the writing back (described later) is executed or not.

FIG. 4 briefly illustrates an exemplary configuration of the buffer set management table 400 according to this embodiment.

The buffer set management table 400 includes a buffer set ID, a purpose of use, a subject generation, and a stored number of I/O.

The purpose of use is previously set for each buffer set indicated by a buffer set ID. For example, if a buffer set is used for the staging, "staging" is set for the purpose of use. If a buffer set is used for the writing back, "writing back" is set. If copy data of Write data is merely stored, "storing" is set. If stored copy data is transferred to the copy target apparatus 120, "transferring" is set.

The subject generation is a generation subjected to processing that is set in accordance with the purpose of use. The stored number of I/O is a number of I/O stored in a buffer set. The subject generation and the stored number of I/O are, for example, updated by the copy source apparatus 110 every time when Write data is stored in a buffer set.

The character "-" in FIG. 4 represents an example in which an "unused state" is set.

FIG. 5 briefly illustrates an exemplary configuration of the save buffer management table 500 according to this embodiment.

The save buffer management table 500 includes the maximum number of generations for copy subject data that can be stored in the save buffer 118, and a save position defining a leading address of a storage region that is a storage region in the save buffer 118 and is assigned to each control module.

The maximum number of generations is determined, for example, when the save buffer 118 is initialized.

Figure 6:
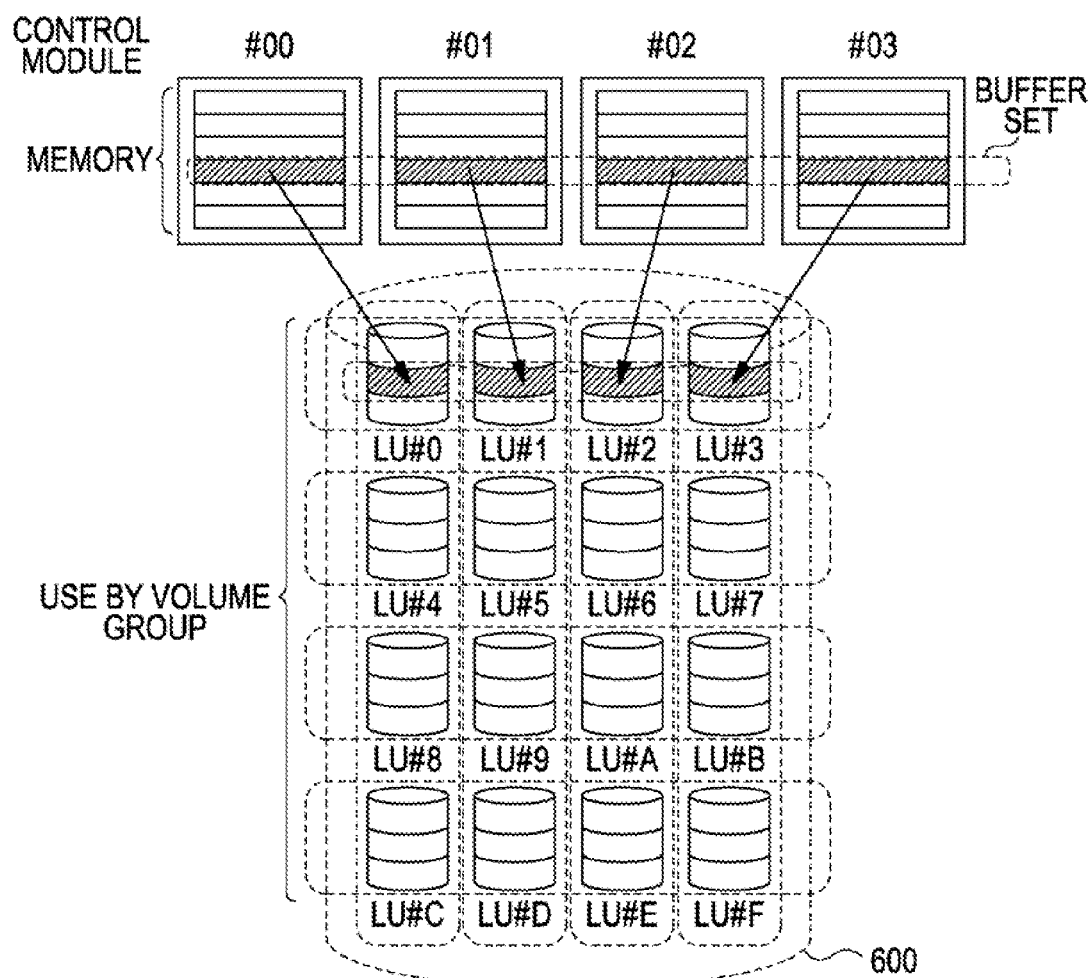
FIG. 6 illustrates an exemplary configuration of a save buffer.

Hereinafter, a storage region for a single generation that is in the save buffer 118 and assigned to each control module is called "individual save buffer." For example, three divided regions in LU#0 in FIG. 6 are individual save buffers.

Figure 7:
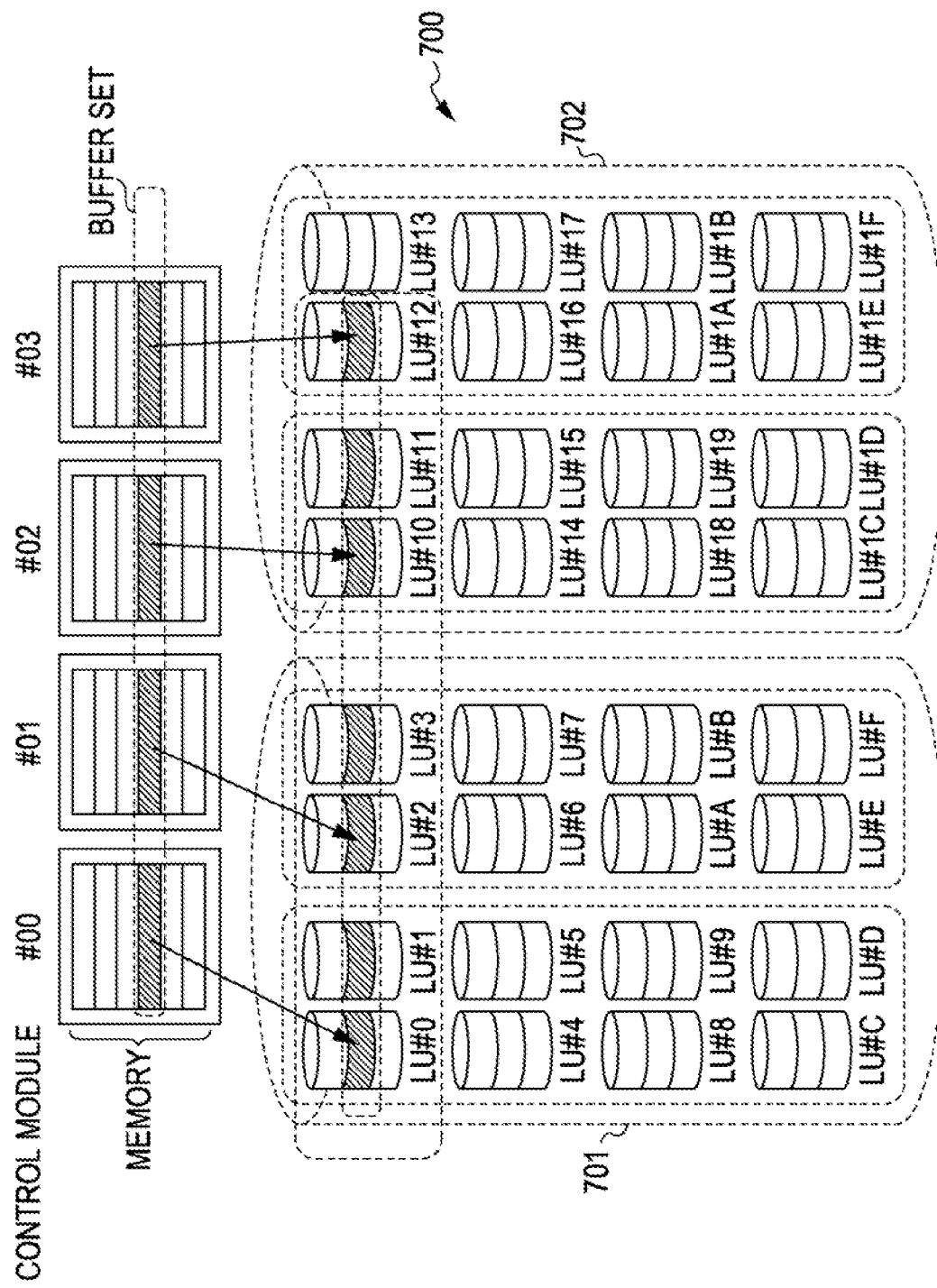
FIG. 7 illustrates an exemplary configuration of a save buffer.

FIGS. 6 and 7 briefly illustrate exemplary configurations of the save buffer 118 according to this embodiment. Referring to FIGS. 6 and 7, the control modules #00 to #03 are schematically illustrated in a simple manner such that only the buffers 201a in the write only buffers 201 are illustrated. However, the configurations of the control modules #00 to #03 are not limited thereto. Also, a dotted line extending over the control modules #00 to #03 indicates a buffer set for a single generation.

FIG. 6 illustrates an example configuration in a case in which the save buffer 118 is configured by a single RAID group.

A RAID group 600 illustrated in FIG. 6 and used for the save buffer 118 includes logical units LU#0 to LU#F. Groups of logical units surrounded by horizontally extending dotted lines, i.e., LU#0 to LU#3, LU#4 to LU#7, LU#8 to LU#B, and LU#C to LU#F respectively configure volume groups.

The RAID group 600 is used on a volume group-by-volume group basis. Volume groups are assigned to the write only buffers in the control modules.

For example, regarding the RAID group 600 illustrated in FIG. 6, the logical units LU#0, LU#4, LU#8, and LU#C are assigned to the write only buffer in the control module #00. The logical units LU#1, LU#5, LU#9, and LU#D are assigned to the write only buffer in the control module #01.

The logical units LU#2, LU#6, LU#A, and LU#E are assigned to the write only buffer in the control module #02. The logical units LU#3, LU#7, LU#B, and LU#F are assigned to the write only buffer in the control module #03.

If the number of logical units of a volume group is larger than the number of control modules, a plurality of logical units may be assigned to a single control module. Also, referring to FIG. 8, a logical unit of a volume group is divided into regions each having a size including an individual buffer that stores buffer data, a BIT, and buffer set information. The divided region is the above-mentioned "individual save buffer."

For example, buffer data stored in the individual buffers in the control modules is stored in the individual save buffers in a volume group assigned to the control modules, in order of the generation of the individual save buffers as indicated by an arrow in FIG. 6.

FIG. 7 illustrates an example configuration in a case in which the save buffer 118 according to this embodiment is configured by two RAID groups.

A RAID group 700 used for the save buffer 118 illustrated in FIG. 7 includes a RAID group 701 including logical units LU#0 to LU#F, and a RAID group 702 including logical units LU#10 to LU#1F.

For example, the logical units LU#0, LU#2, LU#10, and LU#12 configure a volume group. The logical units LU#1, LU#3, LU#11, and LU#13 configure a volume group.

The logical units LU#4, LU#6, LU#14, and LU#16 configure a volume group. The logical units LU#5, LU#7, LU#15, and LU#17 configure a volume group. The logical units LU#8, LU#A, LU#18, and LU#1A configure a volume group. The logical units LU#9, LU#B, LU#19, and LU#1B configure a volume group. The logical units LU#C, LU#E, LU#1C, and LU#1E configure a volume group. The logical units LU#D, LU#F, LU#1D, and LU#1F configure a volume group.

Logical units in a volume group of the RAID group 700 are assigned to the write only buffers in the control modules.

For example, regarding the RAID group 700 illustrated in FIG. 7, the logical units LU#0, LU#1, LU#4, LU#5, LU#8, LU#9, LU#C, and LU#D are assigned to the write only buffer in the control module #00. The logical units LU#2, LU#3, LU#6, LU#7, LU#A, LU#B, LU#E, and LU#F are assigned to the write only buffer in the control module #01.

The logical units LU#10, LU#11, LU#14, LU#15, LU#18, LU#19, LU#1C, and LU#1D are assigned to the write only buffer in the control module #02. The logical units LU#12, LU#13, LU#16, LU#17, LU#1A, LU#1B, LU#1E, and LU#1F are assigned to the write only buffer in the control module #03.

A logical unit of a volume group is divided into regions each having the same size as that of an individual buffer. For example, buffer data stored in an individual buffer in a control module is stored in an individual save buffer of a volume group assigned to the control module, in order of the generation of an individual save buffer as indicated by an arrow in FIG. 7.

Referring to FIG. 7, if the write only buffers in the control modules are assigned to at least two RAID groups, a load of each RAID group can be distributed. FIG. 7 illustrates the case in which the two RAID groups are used; however, a similar advantage can be attained even if more than two RAID groups are used.

As described above, the save buffer 118 according to this embodiment, for example, LU#0 to LU#F illustrated in FIG. 6, or LU#0 to LU#F and LU#10 to LU#1F illustrated in FIG. 7 each are divided into individual save buffers each having a size including an individual buffer, a BIT, and buffer set information and used. FIG. 8 illustrates the overview. In each individual save buffer of the save buffer 118, copy subject data (data to be copied) for a single generation, which particularly includes buffer set information, a BIT, and buffer data, is stored in order of the generation.

Figure 9:
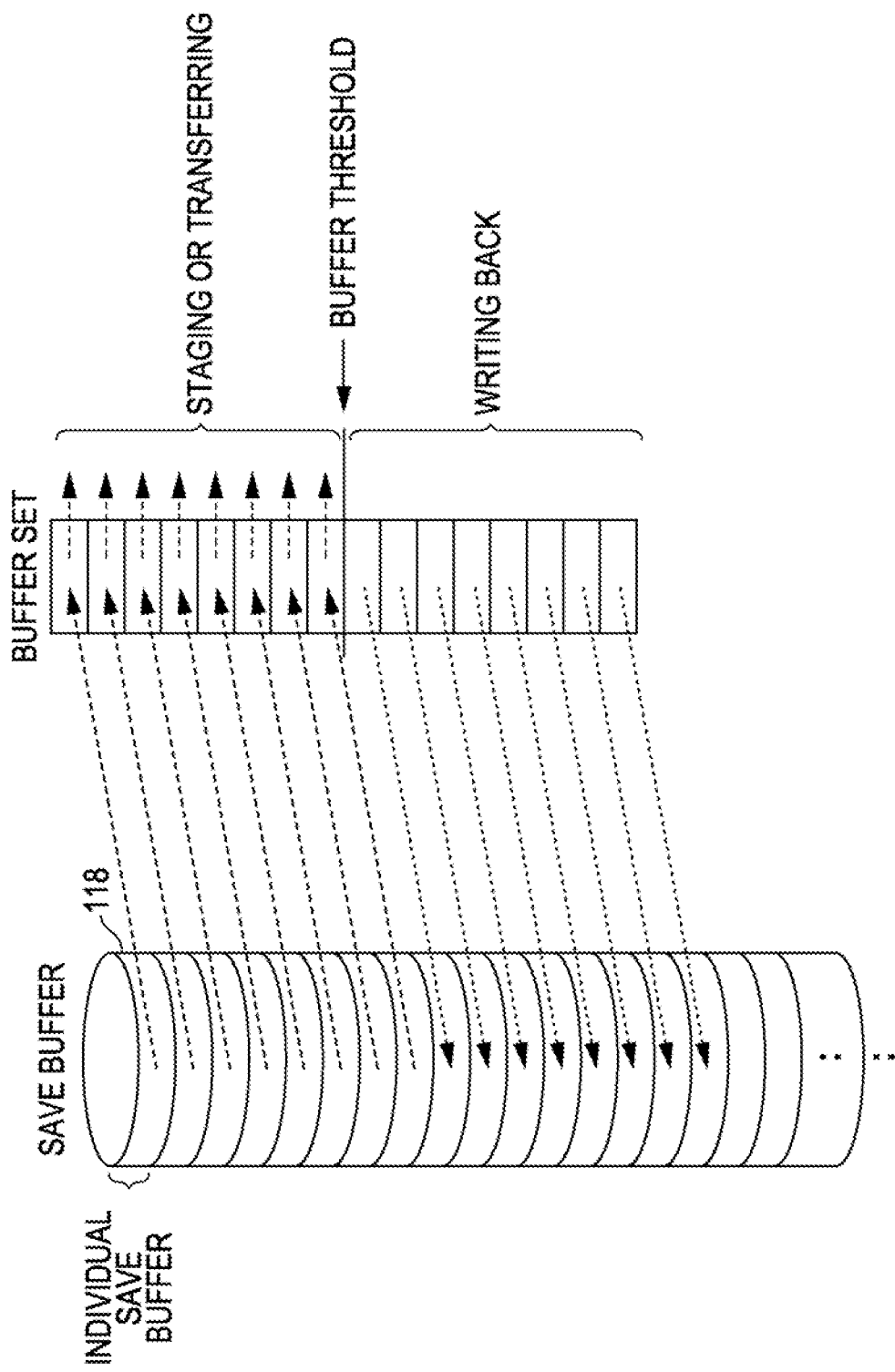
FIG. 9 is an illustration explaining the relationship between the save buffer and buffer sets.

FIG. 9 is an illustration explaining the relationship between the save buffer 118 and buffer sets. FIG. 9 illustrates the buffer sets in a simple manner as compared with the buffer sets illustrated in, for example, FIGS. 6 and 7, to simplify the description. Also, in FIG. 9, the number of buffer sets is 16 instead of 8 to facilitate comparison with respect to FIGS. 26 and 27 (described later). Thus, the configuration of the buffer sets is not limited to one illustrated in FIG. 9.

If the number of buffer sets that are in use because data in the buffer sets is during transferring or waiting for buffer copy processing (or expansion processing) in the copy target apparatus 120 exceeds a buffer threshold, the copy source apparatus 110 saves data stored in buffer sets by a number that exceeds the buffer threshold, to the save buffer 118.

Also, if the buffer sets that are in use because the data in the buffer sets is during the transferring or waiting for the buffer copy processing in the copy target apparatus 120 are released, the copy source apparatus 110 stores the data saved to the save buffer 118, in the released buffer sets.

In this embodiment, hereinafter, saving data stored in a buffer set, to the save buffer 118 is called "writing back." Also, storing the data saved to the save buffer 118, in a buffer set is called "staging."

Further, the number of buffer sets that are in use because data in the buffer sets is during the staging, the transferring, or waiting for the buffer copy processing in the copy target apparatus 120 is called the "number of buffer sets in use." The buffer sets during the transferring includes the buffer sets during the staging.

Alternatively, for example, a "rate of use of buffer sets" may be used instead of the "number of buffer sets in use." In this case, the rate of use of buffer sets is obtained by "number of buffer sets in use"/"total number of buffer sets."

The copy source apparatus 110 optimizes the buffer threshold by increasing or decreasing the buffer threshold in accordance with a load of processing resulted from Write I/O processing. For example, the load of processing resulted from the Write I/O processing may be determined on the basis of the number of Write I/O in a waiting state after reception from the host 150 but before processing.

Alternatively, the buffer threshold may be optimized, for example, by using information including at least one of writing-back/staging performance, data update amount under a Write I/O command, a use state of buffer sets, and a line speed between the copy source apparatus 110 and the copy target apparatus 120, instead of by using the load of processing resulted from the Write I/O processing.

Figure 10:
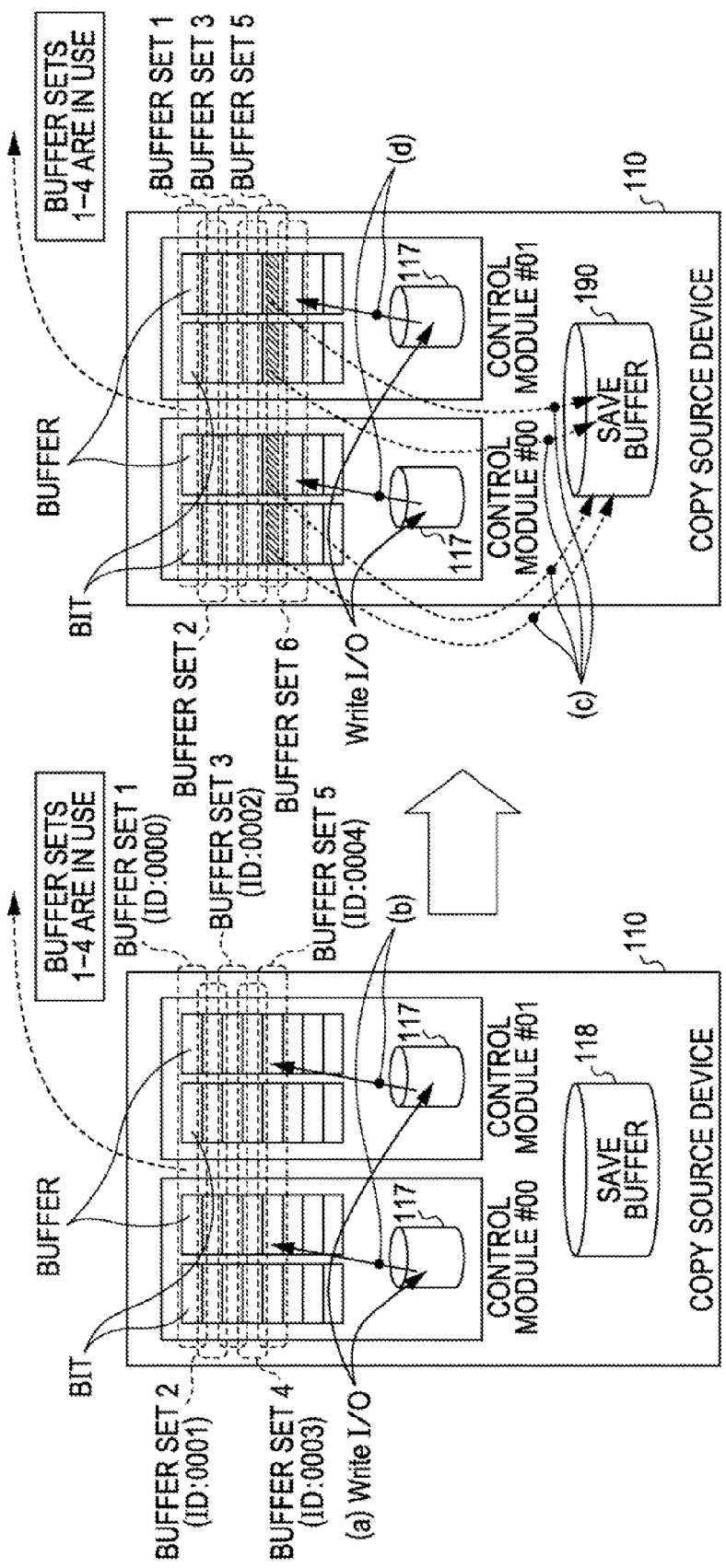
FIG. 10 is an illustration explaining buffer save processing.
Figure 11:
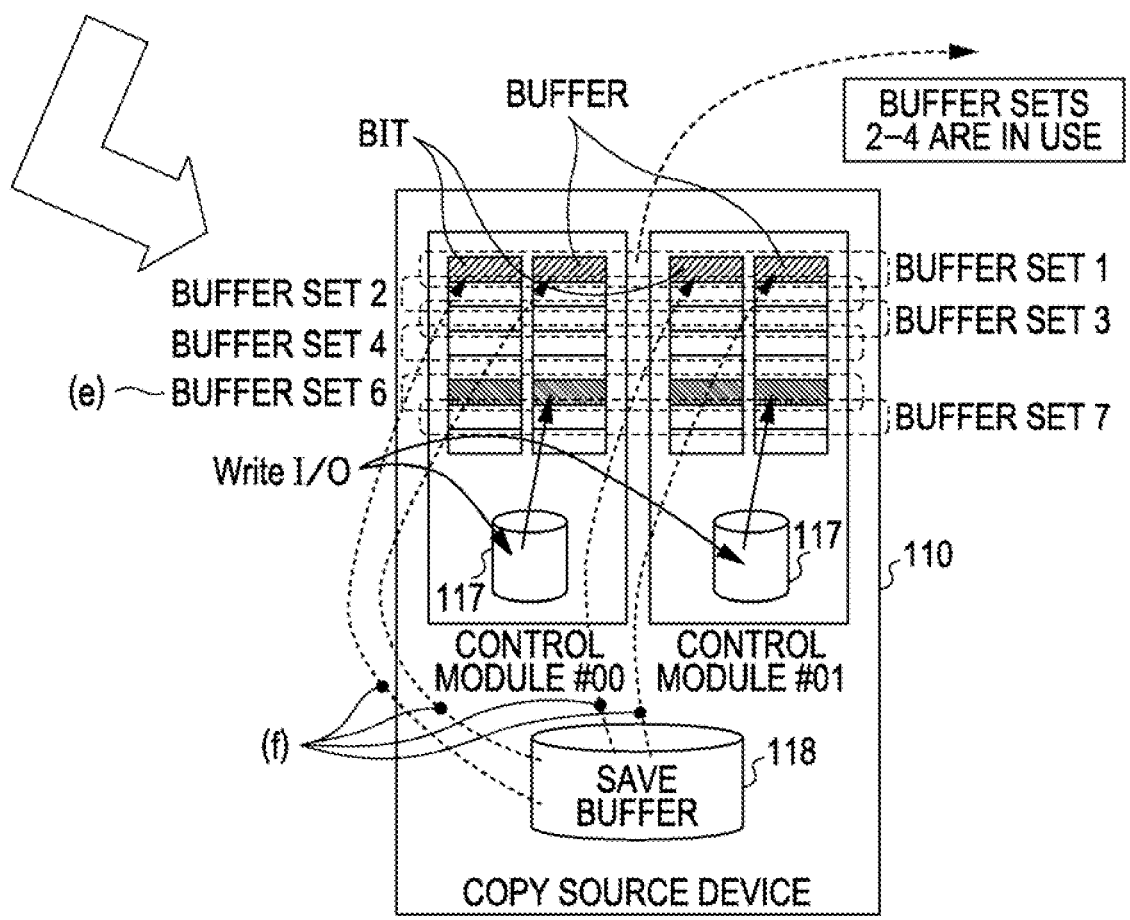
FIG. 11 is an illustration explaining buffer save processing.

FIGS. 10 and 11 are illustrations each explaining buffer save processing.

FIGS. 10 and 11 each briefly illustrate the configuration of the copy source apparatus 110 for the convenience of understanding. For example, only the control modules #00 and #01 are illustrated; however, the configuration of the copy source apparatus 110 is not limited to those illustrated in FIGS. 10 and 11. Also, the control modules respectively include disk devices 117 for the convenience of description. However, the configuration of the copy source apparatus 110 is not limited to those illustrated in FIGS. 10 and 11.

FIG. 10 is an illustration explaining buffer save processing upon reception of a Write I/O command while buffer sets 1 to 4 are in use because data in the buffer sets is during the transferring or waiting for the buffer copy processing by the copy target apparatus 120. Hereinafter, it is assumed that buffer set data stored in the buffer sets 1 to 4 respectively correspond to generations 1 to 4. Also, all control modules included in the copy source apparatus 110 are collectively called a "control module."

(a) Upon the reception of the Write I/O command, the control module stores Write data in the disk device 117 in the control module, and (b) stores copy data of the Write data in a buffer set 5. The buffer set data stored in the buffer set 5 corresponds to a generation 5.

For example, if the number of buffer sets in use exceeds the buffer threshold, (c) the control module saves the buffer set data of the generation 5, which is stored in the buffer set 5 and expected to be transferred to the copy target apparatus 120 next, to the save buffer 118. Then, the control module optimizes the buffer threshold.

After the control module saves the buffer set data to the save buffer 118, the control module changes a storage target of new Write data or the like from the buffer set 5 to a buffer set 6.

(d) Upon reception of new Write I/O command, the control module stores Write data in the disk device, and stores copy data of the Write data in the buffer set 6. The buffer set data stored in the buffer set 6 corresponds to a generation 6.

At this time, since the elder generation than the generation 6 for the buffer set 6, for example, the generation 5 in FIG. 10 is saved to the save buffer 118, (e) the control module saves the buffer set data stored in the buffer set 6, to the save buffer 118.

If the buffer set 1 in use is released, (f) the control module reads out the buffer set data of the generation 5 stored in the save buffer 118, and stores the buffer set data in the buffer set 1. In this embodiment, "releasing" means bringing a buffer set into an unused state.

When the transfer of the buffer data in the buffer set 1 and the buffer copy processing by the copy target apparatus 120 are completed, the control module optimizes the buffer threshold.

Figure 12B:
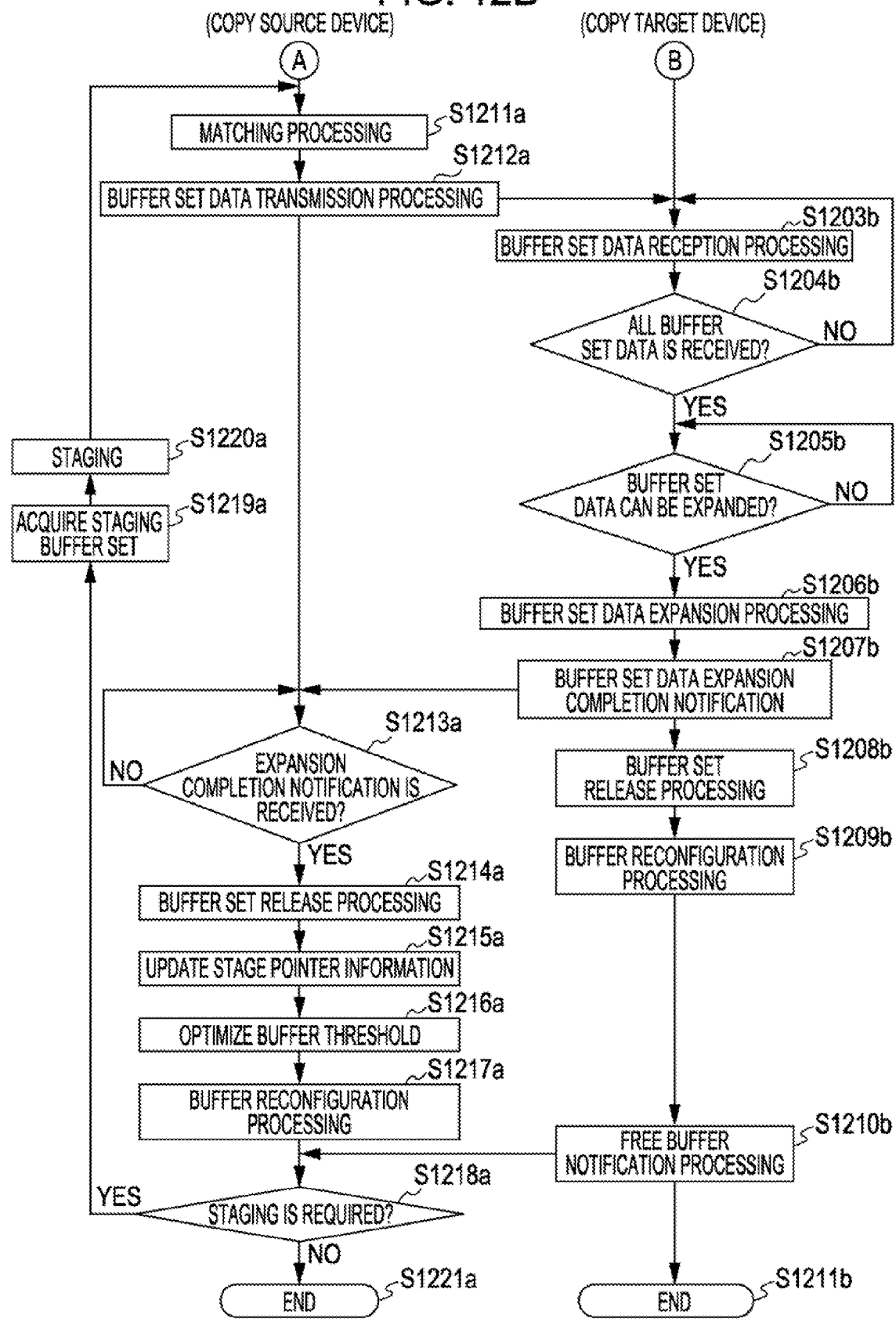
FIG. 12B is a flowchart briefly illustrating remote copy.

FIGS. 12A and 12B are flowcharts briefly illustrating the remote copy according to this embodiment. The remote copy according to this embodiment will be briefly described below with reference to FIGS. 12A and 12B. When the copy source apparatus 110 starts up, the copy source apparatus 110 performs buffer initial configuration processing. For example, the copy source apparatus 110 secures the regions for the configuration illustrated in FIG. 2 in the memory 200 included in each control module in accordance with predetermined configuration information, and initializes the regions.

The copy source apparatus 110 assigns volume groups to the write only buffers in the control modules. Specific processing will be described with reference to FIGS. 14 and 15.

The copy source apparatus 110 generates buffer sets, and performs initial generation processing for the generated buffer sets. For example, the copy source apparatus 110 generates buffer sets by combining individual buffers of the control modules. The copy source apparatus 110 stores the generated buffer sets as buffer set information in the buffer set information storage unit 202.

The copy target apparatus 120 also performs the above processing.

The copy source apparatus 110 initializes the buffer management table 300, the buffer set management table 400, and the save buffer management table 500. The copy source apparatus 110 also initializes the buffer threshold. Specific processing will be described with reference to FIG. 13.

With the above processing, preparation for the remote copy from the copy source apparatus 110 to the copy target apparatus 120 is completed. When the preparation for receiving the Write I/O command from the host 150 is completed, the remote copy is started (S1200a, S1200b).

In S1201a, the copy source apparatus 110 issues an unused buffer notification request command to the copy target apparatus 120 so as to request notification of an unused individual buffer.

Meanwhile, the copy target apparatus 120 shifts the processing to S1201b, and monitors the unused buffer request command until the copy target apparatus 120 receives the unused buffer notification request command from the copy source apparatus 110 (S1201b, NO).

In S1201b, if the copy target apparatus 120 detects the unused buffer notification request command from the copy source apparatus 110 (S1201b, YES), the copy target apparatus 120 shifts the processing to S1202b.

In S1202b, the copy target apparatus 120 retrieves an individual buffer whose region is released and unused. If the copy target apparatus 120 detects an individual buffer whose region is released and unused, the copy target apparatus 120 notifies a buffer ID of the detected individual buffer as an unused buffer ID to the copy source apparatus 110.

Meanwhile, when the copy source apparatus 110 receives the notification of the unused buffer ID from the copy target apparatus 120, the copy source apparatus 110 stores the notified unused buffer ID in the unused buffer ID storage unit 206.

In S1202a, the copy source apparatus 110 acquires a subject buffer set that stores Write data. The subject buffer set that stores the Write data is called "storage subject buffer set."

For example, the copy source apparatus 110 refers to the buffer set management table 400, and acquires a buffer set ID in an unused state. Then, the copy source apparatus 110 sets the acquired buffer set ID as a subject buffer set ID in the buffer management table 300.

The copy source apparatus 110 determines a buffer set with a buffer set ID that is set as the subject buffer set ID in the buffer management table 300, as the "storage subject buffer set," and performs processing as follows.

The copy source apparatus 110 does not perform matching processing in S1202a. The copy source apparatus 110 performs the matching processing in S1211a (described later), that is, before transmission processing for buffer set data.

In S1203a, the copy source apparatus 110 updates the generation set in the write back pointer information in the buffer management table 300 to a value incremented by 1.

In S1204a, the copy source apparatus 110 performs processing for storing the Write data in individual buffers of the storage subject buffer set.

For example, it is assumed that the copy source apparatus 110 receives the Write I/O command from the host 150. Then, the copy source apparatus 110 stores the Write data received with the Write I/O command in the storage subject buffer set indicated by the subject buffer set ID currently used in the buffer management table 300, or particularly stores the Write data in individual buffers of the control modules in a distributed manner.

In S1205a, the copy source apparatus 110 judges whether a storage region that stores the data remains in the storage subject buffer set. If no storage region remains (S1205a, NO), the copy source apparatus 110 shifts the processing to S1207a.

In S1205a, if the storage region remains (S1205a, YES), the copy source apparatus 110 shifts the processing to S1206a. In this case, the copy source apparatus 110 judges whether a predetermined time has elapsed after the acquisition of the storage subject buffer set (S1206a).

If the predetermined time has not elapsed (S1206a, NO), the copy source apparatus 110 shifts the processing to S1204a. If the predetermined time has elapsed (S1206a, YES), the copy source apparatus 110 shifts the processing to S1207a.

In S1207a, the copy source apparatus 110 acquires new storage subject buffer set by processing similar to S1202a. In S1208a, the copy source apparatus 110 changes the storage subject buffer set to the new storage subject buffer set acquired in S1207a.

The storage subject buffer set before the change is called "write-back subject buffer set" in the processing in S1210a, and is called "transfer subject buffer set" in the processing in S1212a or later.

In S1209a, the copy source apparatus 110 updates the write back pointer information by processing similar to S1203a.

In S1210a, the copy source apparatus 110 performs write back processing. Then, the copy source apparatus 110 optimizes the buffer threshold. The copy source apparatus 110 shifts the processing to S1211a.

In S1211a, the copy source apparatus 110 performs the matching processing. For example, the copy source apparatus 110 acquires an unused buffer ID from the unused buffer ID storage unit 206. The copy source apparatus 110 assigns the acquired unused buffer ID to a copy target ID of the transfer subject buffer set, to associate a copy source ID of the transfer subject buffer set with the copy target ID.

In S1212a, the copy source apparatus 110 transmits buffer set data stored in the transfer subject buffer set to the copy target apparatus 120. The buffer set data includes buffer data stored in the buffer 201a, a BIT stored in the BIT storage unit 201b, and buffer set information stored in the buffer set information storage unit 202 in each control module.

Meanwhile, when the copy target apparatus 120 receives the buffer set data from the copy source apparatus 110, the copy target apparatus 120 shifts the processing to S1203b.

In S1203b, the copy target apparatus 120 performs reception processing for the buffer set data. For example, the copy target apparatus 120 stores the buffer data in the buffer 201a, the BIT in the BIT storage unit 201b, and the buffer set information in the buffer set information storage unit 202, from among the received buffer set data.

In S1204b, the copy target apparatus 120 judges whether the copy target apparatus 120 has received all buffer set data. If the copy target apparatus 120 has received not all buffer set data (S1204b, NO), the copy target apparatus 120 shifts the processing to S1203b, and repeats the processing from steps S1203b to S1204b.

In S1204b, if the copy target apparatus 120 has received all buffer set data (S1204b, YES), the copy target apparatus 120 shifts the processing to S1205b.

In S1205b, the copy target apparatus 120 determines whether the buffer set data acquired in S1203b can be expanded in the disk device 127 that is a storing device included in the copy target apparatus 120. If the data can be expanded (S1205b, YES), the copy target apparatus 120 shifts the processing to S1206b.

In S1206b, the copy target apparatus 120 expands the buffer set data acquired in S1203b, in the disk device 127 included in the copy target apparatus 120. When the expansion is ended, the copy target apparatus 120 shifts the processing to S1207b, and notifies the completion of the expansion of the buffer set data to the copy source apparatus 110. Hereinafter, the notification is called "buffer set data expansion completion notification."

When the expansion of the buffer set data in the disk device 127 is ended, in S1208b, the copy target apparatus 120 performs buffer set release processing. For example, the copy target apparatus 120 sets the buffer set, whose buffer set data has been expanded in the disk device 127, to be an unused state.

In S1209b, the copy target apparatus 120 uses the released region and secures new regions in the buffer set information storage unit 202 and the write only buffer 201, so as to construct the configuration illustrated in FIG. 2.

When the above processing is ended, the copy target apparatus 120 shifts the processing to S1210b, and notifies an unused buffer ID that newly becomes available as a result of the processing in steps S1208b to S1209b to the copy source apparatus 110 (S1210b). When the copy source apparatus 110 receives the unused buffer ID, the copy source apparatus 110 stores the notified unused buffer ID in the unused buffer ID storage unit 206.

Meanwhile, in S1213a, the copy source apparatus 110 determines whether the copy source apparatus 110 has received the buffer set data expansion completion notification from the copy target apparatus 120. If the copy source apparatus 110 does not receive the buffer set data expansion completion notification (S1213a, NO), the copy source apparatus 110 repeats the processing in S1213a. If the copy source apparatus 110 has received the buffer set data expansion completion notification from the copy target apparatus 120 (S1213a, YES), the copy source apparatus 110 shifts the processing to S1214a.

In S1214a, like S1208b, the copy source apparatus 110 performs the buffer set release processing for the transfer subject buffer set with the buffer set data transmission processing performed in S1212a. In particular, the copy source apparatus 110 refers to the buffer set management table 400, and sets the transfer subject buffer set, whose data has been transferred, to be an unused state.

In S1215a, the copy source apparatus 110 refers to the buffer management table 300, and updates the generation set in the stage pointer information to a value incremented by 1. In S1216a, the copy source apparatus 110 performs processing for optimizing the buffer threshold. In S1217a, the copy source apparatus 110 performs buffer reconfiguration processing by, for example, initializing the region of the buffer set brought into an unused state.

In S1218a, the copy source apparatus 110 judges whether the staging is required. For example, the copy source apparatus 110 judges the necessity of the staging by determining whether the save buffer 118 includes a saved generation.

The copy source apparatus 110 can determine the presence of the saved generation in the save buffer 118 by the following processing (a) to (d).

(a) The copy source apparatus 110 refers to the buffer management table 300, and acquires the write back pointer information and the stage pointer information.

(b) The copy source apparatus 110 refers to the buffer set management table 400, and retrieves a generation not included in the buffer set management table 400 by successively checking generations in ascending order from the generation obtained by adding 1 to the generation corresponding to the stage pointer information.

For example, the buffer management table 300 illustrated in FIG. 3 includes a generation 2 for the stage pointer information. The copy source apparatus 110 refers to the buffer set management table 400 illustrated in FIG. 4, and successively checks the generation 3, obtained by adding 1 to the generation 2, and then generations 4, 5 . . . in ascending order. Thus, the copy source apparatus 110 detects a generation 7 not included in the buffer set management table 400.

(c) The copy source apparatus 110 refers to the buffer set management table 400, and retrieves a generation not included in the buffer set management table 400 by successively checking generations in descending order from the generation corresponding to the write back pointer information.

For example, the buffer management table 300 illustrated in FIG. 3 includes a generation 15 for the write back pointer information. The copy source apparatus 110 refers to the buffer set management table 400 illustrated in FIG. 4, and successively checks the generations 15, 14, 13 . . . , in descending order. Thus, the copy source apparatus 110 detects a generation 12 not included in the buffer set management table 400.

(d) With the above processing, it is found that the detected generations 7 to 12 are saved to the save buffer 118.

In S1218*a*, if the save buffer 118 includes the saved generations (S1218*a*, YES), the copy source apparatus 110 shifts the processing to S1219*a*. If the save buffer 118 includes no saved generation (S1218*a*, NO), the copy source apparatus 110 shifts the processing to S1221*a*.

In S1219*a*, the copy source apparatus 110 acquires a buffer set used for the staging, i.e., a staging buffer set.

For example, the copy source apparatus 110 refers to the buffer set management table 400, and acquires a buffer set ID in an unused state, as a "staging subject buffer set ID."

The copy source apparatus 110 refers to the buffer set management table 400, and sets a subject generation with a buffer set ID corresponding to the staging subject buffer set ID, to a staging subject generation (described later).

The copy source apparatus 110 refers to the buffer set management table 400, and sets the purpose of use for the buffer set ID corresponding to the staging subject buffer set ID, to the "staging."

In S1220*a*, the copy source apparatus 110 performs the staging. When the staging is completed, the copy source apparatus 110 shifts the processing to S1211*a*.

When the above processing is ended, the copy source apparatus 110 ends the remote copy, or shifts the processing to S1204*a* to continue the remote copy. When the copy source apparatus 110 receives new Write I/O command from the host 150, the copy source apparatus 110 shifts the processing to S1204*a* etc., and continues the remote copy.

When the above processing is ended, the copy target apparatus 120 ends the remote copy, or shifts the processing to S1203*b* to continue the remote copy.

The following processing in the remote copy according to this embodiment will be more specifically described below.

(1) Processing for initializing buffer threshold
(2) Processing for generating region of save buffer 118
(3) Processing for assigning save buffer 118 to control modules
(4) Processing for changing buffer set
(5) Processing for updating write back pointer information and stage pointer information
(6) Write back processing
(7) Staging processing
(8) Processing for optimizing buffer threshold The processing (1) to (8) will be described below in that order.

(1) Processing for Initializing Buffer Threshold

FIG. 13 is a flowchart illustrating the processing for initializing the buffer threshold according to this embodiment. The processing illustrated in FIG. 13 may be executed when the copy source apparatus 110 starts up or during maintenance operation.

In S1301, the copy source apparatus 110 reads out from a predetermined address in the memory 200 the number of control modules (CTRL_CNT), a buffer size (BUFF_SIZE) [MByte], a buffer set size (1GENE_SIZE) [MByte], a line bandwidth (BANDWIDTH) [MByte/S], a transfer ratio (TRANS_RATIO), a control ratio (SYSTEM_RATIO), a data compression ratio (COMPRESS) [%], and a corrected number of transmission buffers (BUFF_ALPHA).

The number of control modules (CTRL_CNT) is the number of control modules included in the copy source apparatus 110. The buffer size (BUFF_SIZE) is a total size of the buffers 201*a* included in the control modules. The buffer set size (1GENE_SIZE) is a size of a buffer set for a single generation.

The line bandwidth (BANDWIDTH) is a bandwidth available for the network or the dedicated line 130 connecting the copy source apparatus 110 with the copy target apparatus 120.

The transfer ratio (TRANS_RATIO) is a transfer ratio during transfer processing between the copy source apparatus 110 and the copy target apparatus 120. For example, if a theoretical transfer rate is 100 Mbps and an actual average transfer rate is 75 Mbps, the transfer ratio is 0.75.

The control ratio (SYSTEM_RATIO) is basically 1. For example, the control ratio is used for adjusting the buffer threshold in accordance with a data transfer ratio between the host 150 and the copy source apparatus 110, a transfer ratio between the control modules, and a data transfer ratio between the control modules and the save buffer 118.

The data compression ratio (COMPRESS) is a compression ratio of transmission data when being transferred to the copy target apparatus 120. The corrected number of transmission buffers (BUFF_ALPHA) is a value for adjusting the buffer threshold as required.

After the copy source apparatus 110 reads out the above data, the copy source apparatus 110 calculates the buffer threshold (THRESHOLD) by the following expression. The copy source apparatus 110 shifts the processing to S1302.

$$\text{THRESHOLD} = ((\text{BANDWIDTH} \times \text{TRANS\_RATIO} \times \text{SYSTEM\_RATIO}) \div (1\text{GENE\_SIZE} \times (\text{COMPRESS} \div 100) \times \text{CTRL\_CNT}) + \text{BUFF\_ALPHA}) \times 2 \qquad (1)$$

In S1302, the copy source apparatus 110 judges whether the buffer threshold is smaller than 1. If the buffer threshold is smaller than 1 (S1302, YES), the copy source apparatus 110 shifts the processing to S1303. In this case, the copy source apparatus 110 sets the buffer threshold to 1 (S1303), and shifts the processing to S1304.

In S1302, if the buffer threshold is not smaller than 1 (S1302, NO), the copy source apparatus 110 shifts the processing to S1304.

In S1304, the copy source apparatus 110 judges whether the buffer threshold exceeds the maximum number of buffer sets. If the buffer threshold exceeds the maximum number of buffer sets (S1304, YES), the copy source apparatus 110 shifts the processing to S1305. In this case, the copy source apparatus 110 sets the buffer threshold to the maximum number of buffer sets (S1305), and shifts the processing to S1306.

In S1304, if the buffer threshold does not exceed the maximum number of buffer sets (S1304, NO), the copy source apparatus 110 shifts the processing to S1306.

When the above processing is ended, the copy source apparatus 110 ends the processing for initializing the buffer threshold.

(2) Processing for Generating Region of Save Buffer 118

FIG. 14 is a flowchart illustrating the processing for generating the region of the save buffer 118 according to this embodiment. The processing illustrated in FIG. 14 may be executed during the maintenance operation of the copy source apparatus 110.

In S1401, the copy source apparatus 110 selects the region for the save buffer 118 from the buffer 201*a* of the write only buffer 201. The copy source apparatus 110 shifts the processing to S1402, and selects a disk device for configuring RAID in accordance with an input by a user.

In S1403, the copy source apparatus 110 checks whether the disk device selected in S1402 satisfies a condition for configuring the RAID. If the disk device does not satisfy the condition (S1403, NO), the copy source apparatus 110 displays a notice to ask the user to designate another disk device on a display device or the like, and shifts the processing to S1402.

In S1403, if the disk device satisfies the condition (S1403, YES), the copy source apparatus 110 shifts the processing to S1404.

In S1404, the copy source apparatus 110 generates a RAID group configured by the disk device selected in S1402, and reflects the information into configuration information that holds a device configuration etc. of the copy source apparatus 110.

In S1405, the copy source apparatus 110 generates a plurality of volumes in the RAID group generated in S1404. The copy source apparatus 110 shifts the processing to S1406, and reflects the configuration of logical units generated in S1405 into the configuration information.

In S1407, the copy source apparatus 110 determines volumes to be used in the control modules by the processing illustrated in FIG. 15 (hereinafter, the volumes are called "assigned volumes"). The control modules use the determined volumes as the region of the save buffer 118.

In S1408, the copy source apparatus 110 initializes the buffer threshold. The copy source apparatus 110 shifts the processing to S1409, and ends the processing for generating the region of the save buffer 118.

(3) Processing for Assigning Save Buffer 118 to Control Modules

Figure 15:
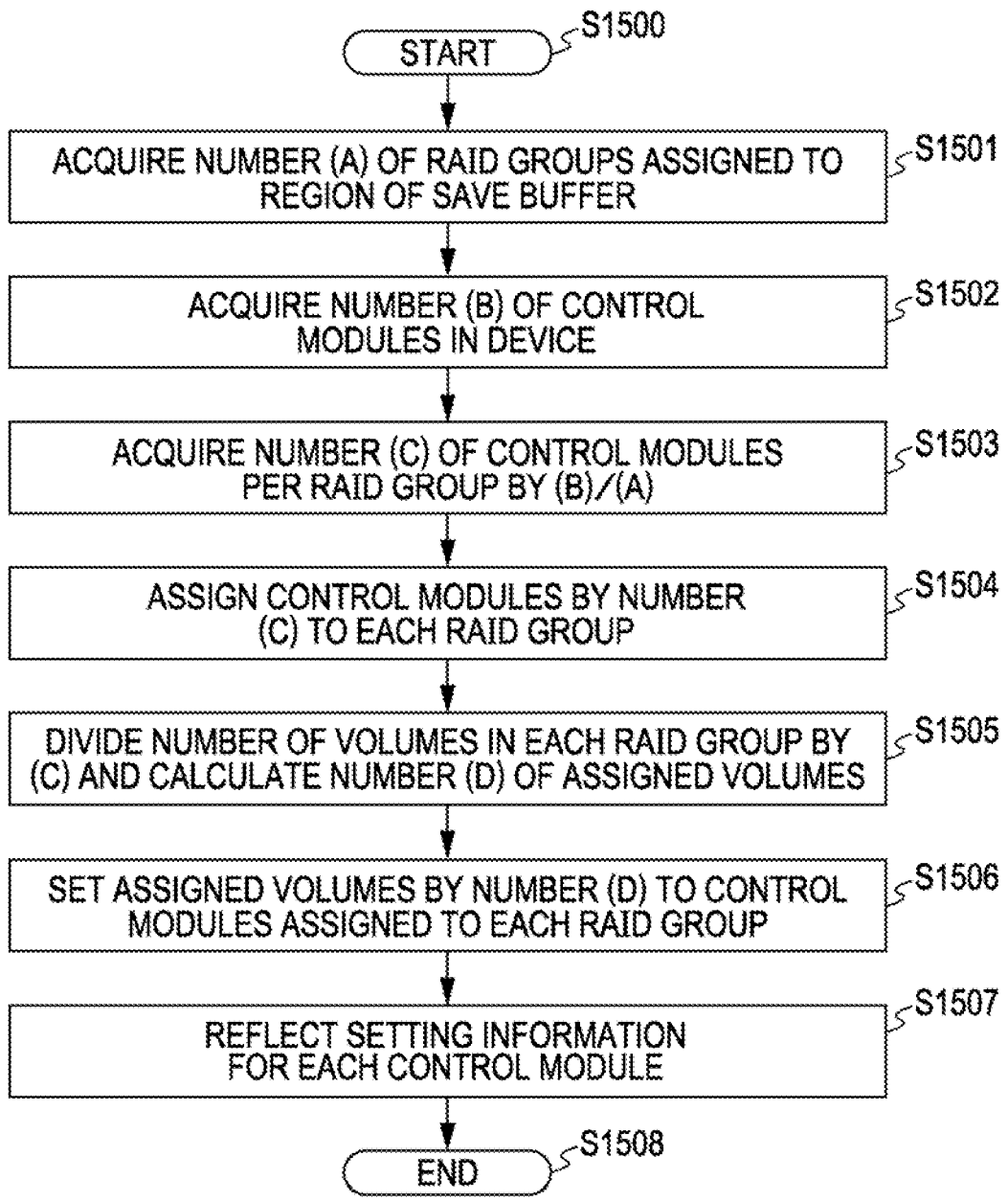
FIG. 15 is a flowchart illustrating specific processing for assigning the save buffer to control modules.

FIG. 15 is a flowchart illustrating specific processing of assigning the save buffer 118 to the control modules according to this embodiment (S1407). The processing illustrated in FIG. 15 may be executed when the copy source apparatus 110 starts up or during the maintenance operation.

In S1501, the copy source apparatus 110 refers to the configuration information and acquires the number (A) of RAID groups assigned as the save buffer 118.

The copy source apparatus 110 shifts the processing to S1502, and acquires the number (B) of control modules in the copy source apparatus 110 from the configuration information.

In S1503, the copy source apparatus 110 calculates the number (C) of control modules per RAID group by an expression (C)=(B)/(A). The copy source apparatus 110 shifts the processing to S1504, and assigns control modules by the number (C) to each RAID group.

In S1505, the copy source apparatus 110 divides the number of volumes in each RAID group by (C), and calculates the number (D) of assigned volumes. The copy source apparatus 110 shifts the processing to S1506, and assigns the assigned volumes by the number (D) to each of the control modules assigned to the RAID group on the basis of the calculation result in S1505.

In S1507, the copy source apparatus 110 reflects the configuration determined in the above processing into the configuration information and setting information included in each control module, and ends the processing (S1508).

(4) Processing for Changing Buffer Set

Figure 16:
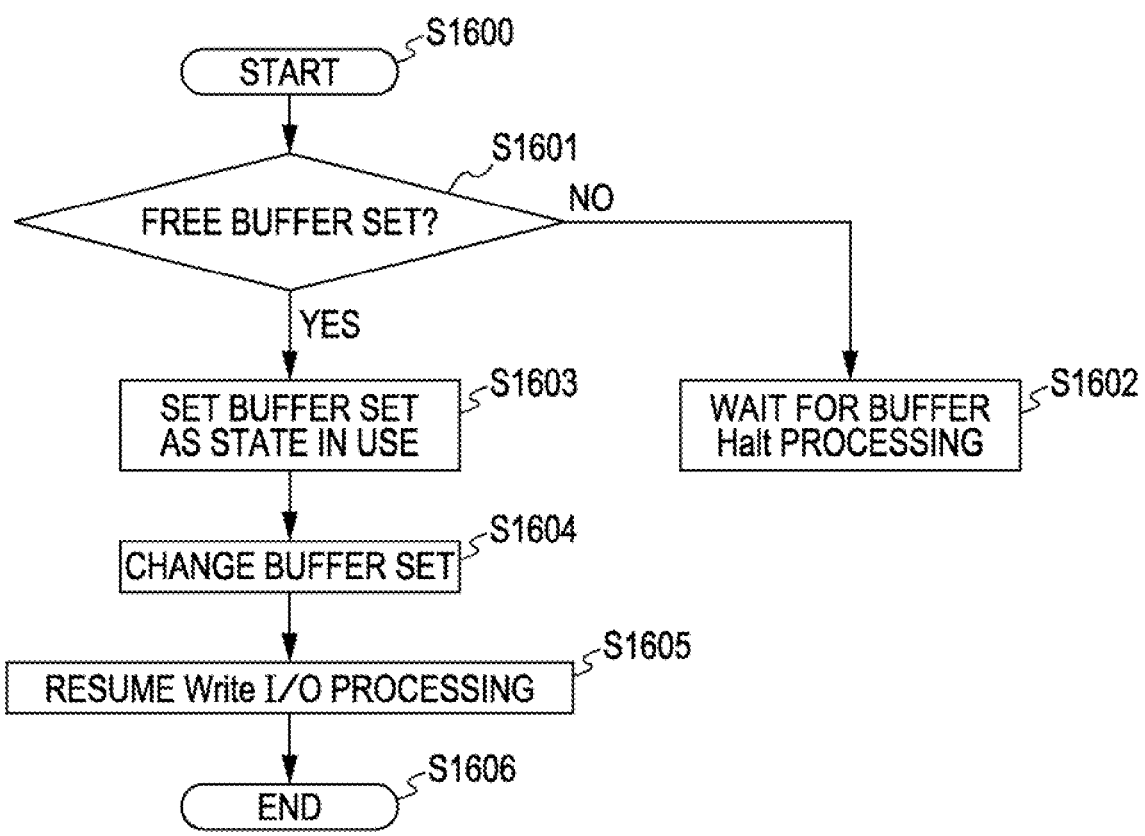
FIG. 16 is a flowchart illustrating processing for changing a buffer set.

FIG. 16 is a flowchart illustrating the processing for changing the buffer set according to this embodiment. The processing in FIG. 16 is specific processing of S1208a illustrated in FIG. 12A.

For example, if an individual buffer in a buffer set has no free space during storage processing in the extension of Write I/O, or if a predetermined time has elapsed after the processing for changing the buffer set is performed, the copy source apparatus 110 starts the processing for changing the buffer set (S1600).

In S1601, the copy source apparatus 110 judges whether a free buffer set is present, or particularly whether the buffer set management table 400 includes a buffer set that is set in an unused state.

In S1601, if no free buffer set is present (S1601, NO), the copy source apparatus 110 shifts the processing to S1602, and waits for buffer Halt processing (S1602). Then, the buffer Halt processing is executed, and shortage of a buffer is addressed, the copy source apparatus 110 resumes the processing of the Write I/O command.

In this case, the copy source apparatus 110 writes back information such as the Write data stored in the buffer set into a dedicated bit map, and performs remote copy transfer that does not ensure the ordering on the basis of the bit map after the buffer Halt processing is executed.

In S1601, if a free buffer set is present (S1601, YES), the copy source apparatus 110 shifts the processing to S1603. The copy source apparatus 110 selects a single free buffer set, and sets the selected buffer set to be in a used state. That is, the copy source apparatus 110 sets the purpose of use in the buffer set management table 400 to the staging, writing back, or storing (S1603) as required.

In S1604, the copy source apparatus 110 changes the buffer set to be used, to the buffer set selected in S1603. Then, the copy source apparatus 110 refers to a hold queue or the like that manages Write I/O commands, and resumes the processing for waiting Write I/O.

When the above processing is ended, the copy source apparatus 110 ends the processing for changing the buffer set.

(5) Processing for Updating Write Back Pointer Information and Stage Pointer Information The buffer save processing according to this embodiment uses the write back pointer information and the stage pointer information, and manages a writing position (generation) of data to be stored in the save buffer 118 and a reading position (generation) of data to be read from the save buffer 118.

Figure 17:
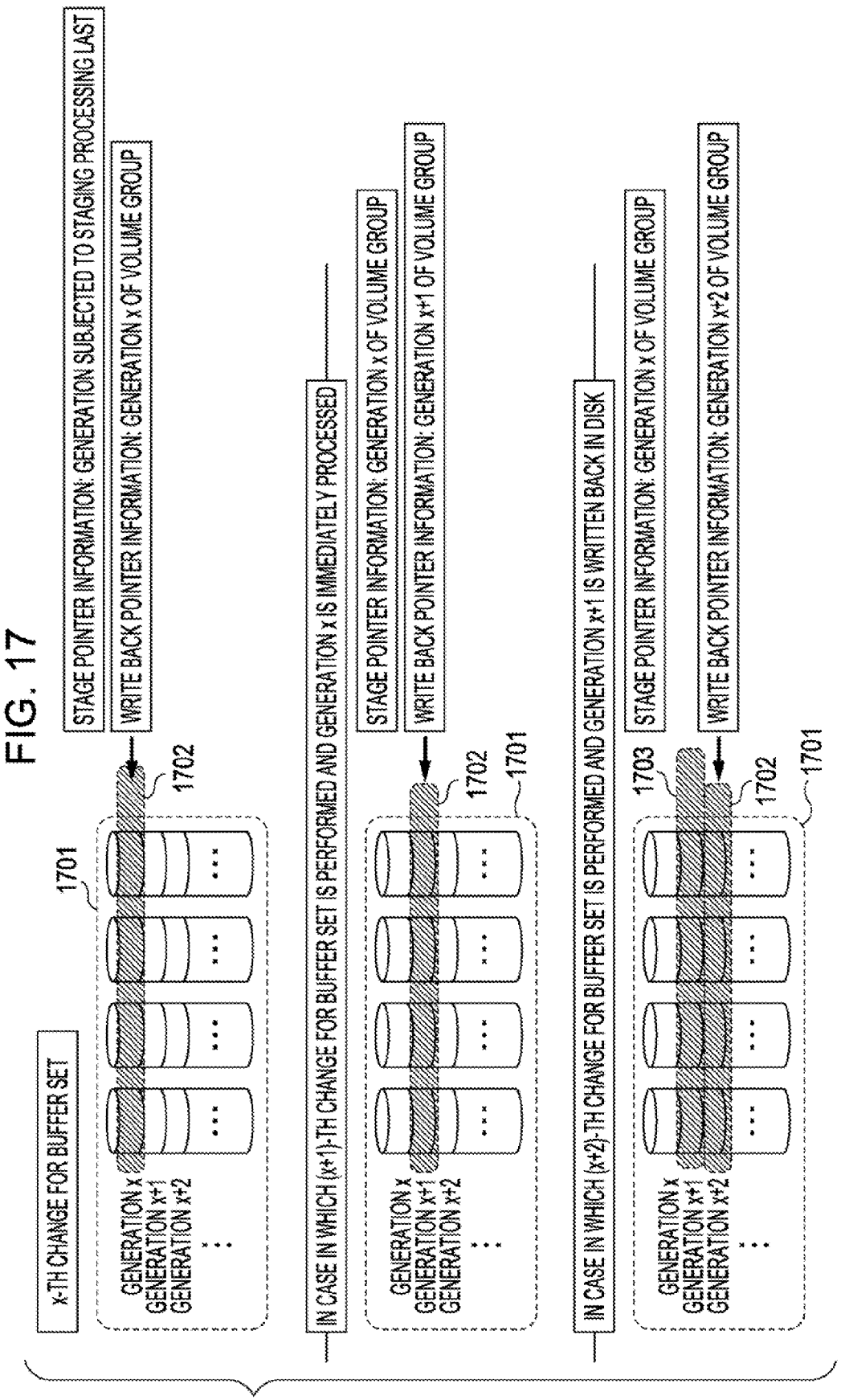
FIG. 17 is an illustration explaining write back pointer information and stage pointer information in the buffer save processing.

FIG. 17 is an illustration explaining the write back pointer information and the stage pointer information in the buffer save processing according to this embodiment. Reference sign 1701 in FIG. 17 indicates the save buffer 118 in a simple manner. Similarly, reference signs 1702 and 1703 in FIG. 17 indicate the buffer sets in a simple manner.

For example, a case is considered in which x-th time change for the buffer set is performed in the control module. In this case, the stage pointer information holds as information the generation that the staging has been performed last. The write back pointer information holds as information a generation x of the save buffer 1701.

Also, a case is considered in which buffer set data of the generation x is transferred to the copy target apparatus 120 immediately after (x+1)-th time change for the buffer set is performed in the control module. In this case, when buffer set data stored in the generation x is staged and the transfer processing is completed, the stage pointer information is updated from the generation x to a generation x+1. The write back pointer information holds as the information the generation x+1 of the save buffer 1701.

Further, a case is considered in which buffer set data of the generation x+1 is written back to the save buffer 1701 when (x+2)-th time change for the buffer set is performed in the control module. In this case, if the generation of the save buffer 1701 held in the stage pointer information is the generation x, the next staging subject is the generation x+1. The write back pointer information holds the generation x+2 in the volume group.

As described above, every time when a buffer set is generated, the write back pointer information holds a next generation of that buffer set as information. Also, every time when the processing for the buffer set of the old generation after the change is completed, for example, every time when the transferring of buffer set data is completed in the copy source apparatus 110 and the expansion of the data is completed in the copy target apparatus 120, the stage pointer information is updated.

If there are a plurality of volume groups assigned as the save buffer 1701, the volume groups are used in ascending order of numbers assigned to the volume groups. If all volume groups are used up, the order returns to the first volume group, so that the volume groups are used cyclically.

FIGS. 18 and 19 explain specific update processing for the write back pointer information and the stage pointer information.

FIG. 18 is a flowchart illustrating the update processing for the write back pointer information according to this embodiment.

In S1800a, a master control module that is representative of the control modules included in the copy source apparatus 110 shifts the processing to S1801a when the processing for changing the buffer set is performed.

In S1801a, the master control module advances the currently holding write back pointer information by 1. For example, the master control module increments the generation held in the write back pointer information in the buffer management table 300 by 1.

In S1802a, the master control module updates the write back pointer information obtained in S1801a by reflecting the buffer management table 300 of the master control module into the write back pointer information. The master control module requests the other control modules included in the copy source apparatus 110 to perform processing similar to S1802a.

Meanwhile, in S1801b, each of the other control modules updates the write back pointer information obtained in S1801a by reflecting buffer management table 300 of the control module into the write back pointer information. The control module notifies completion of the update of the buffer management table 300 to the master control module.

In S1803a, the master control module checks whether the master control module has received replies from all requested control modules. If there is a control module without a reply (S1803a, NO), the master control module repeats the processing in S1803a.

In S1803a, if the master control modules has received the replies from all requested control modules (S1803a, YES), the master control module shifts the processing to S1804a, and ends the update processing for the write back pointer information.

FIG. 19 is a flowchart illustrating the update processing for the stage pointer information according to this embodiment.

In S1900a, the master control module in the copy source apparatus 110 shifts the processing to S1901a when the release processing for the buffer set is started.

In S1901a, the master control module judges whether a release subject buffer set is present. If no release subject buffer set is present (S1901a, NO), the master control module shifts the processing to S1904a, and ends the processing.

In this embodiment, determined as the release subject buffer set is a buffer set notified such that the transferring of data in the buffer set to the copy target apparatus 120 has been completed and that expansion of the transferred data into the disk device from the copy target apparatus 120 has been completed.

In S1901a, if the release subject buffer set is present (S1901a, YES), the master control module shifts the processing to S1902a.

In S1902a, the master control module releases an individual buffer, a BIT, and buffer set information of the release subject buffer set, and updates the stage pointer information. For example, the master control module updates the generation held in the stage pointer information in the buffer management table to the next generation.

The master control module requests the other control modules included in the copy source apparatus 110 to perform processing similar to S1902a.

In S1901b, when each of the other control modules receives the request from the master control module, the control module releases the individual buffer, the BIT, and the buffer set information of the release subject buffer set, and updates the stage pointer information. When the processing is completed, the control module notifies the completion to the master control module.

In S1903a, the master control module checks replies from the requested control modules, and judges whether the master control module has received the replies from all control modules. If there is a control module without a reply (S1903a, NO), the master control module repeats the processing in S1903a.

In S1903a, if the master control module has received the replies from all requested control modules (S1903a, YES), the master control module shifts the processing to S1904a, and ends the update processing for the stage pointer information.

(6) Writing Back from Write Only buffer 201 to Save Buffer 118

FIG. 20 is a flowchart illustrating the writing back according to this embodiment.

In S2000a, for example, if the storage processing of the Write data in the buffer set is completed, the master control module in the copy source apparatus 110 shifts the processing to S2001a.

In S2001a, the master control module acquires the number of buffer sets used for the staging or transferring. The master control module compares the number of buffer sets used for the staging or transferring with the buffer threshold. If the number of buffer sets in use is not the buffer threshold or larger (S2001a, NO), the master control module shifts the processing to S2006a. If the number of buffer sets used for the staging or transferring is the buffer threshold or larger (S2001a, YES), the master control module shifts the processing to S2002a.

In S2002a, the master control module performs the write back processing as follows. Herein, a buffer set subjected to the writing back is called "writing back subject generation."

The master control module calculates an address of an individual save buffer, in which a writing back subject generation is stored, from the save buffer management table 500. The master control module stores in the calculated address buffer data, a BIT, and buffer set information stored in an individual buffer included in the master control module, from among the writing back subject buffer set described with reference to S1208a in FIG. 12A.

If the save buffer assigned to the control module has a continuous address space, a leading address of the individual save buffer can be obtained by adding "(writing back subject generation−1)×individual save buffer size" to "storage leading address of save data" set in the save buffer management table 500.

When the writing back is completed, the master control module requests the other control modules included in the copy source apparatus 110 to perform processing similar to S2002*a*.

In S2001*b*, each of the other control modules acquires the buffer data, the BIT, and the buffer set information stored in the individual buffer included in the control module, from among the buffer set requested from the master control module, from the BIT storage unit 201*b* etc. of the control module. The control module saves the acquired BIT and the buffer set information to an individual save buffer assigned to the control module.

If the save buffer assigned to each of the other control modules has a continuous address space, a leading address of the individual save buffer assigned to the control module can be obtained by adding "(writing back subject generation−1)× individual save buffer size" to "storage leading address of save data" set in the save buffer management table 500.

In S2002*b*, each of the other control modules checks whether buffer data such as Write data is stored in the individual buffer included in the control module, from among the buffer set requested by the master control module.

If the buffer data such as the Write data is not preset in the individual buffer (S2002*b*, NO), each of the other control modules skips S2003*b*. If the buffer data such as the Write data is preset in the individual buffer (S2002*b*, YES), the control module shifts the processing to S2003*b*.

In S2003*b*, each of the other control modules saves the buffer data such as the Write data stored in the individual buffer to the individual save buffer of the save buffer 118 assigned to the control module. Then, the control module notifies completion of the requested processing to the master control module.

Meanwhile, in S2003*a*, the master control module checks whether the master control module has received replies from all requested control modules. If there is a control module without a reply (S2003*a*, NO), the master control module repeats the processing in S2003*a*.

If the master control module has received the replies from all control modules (S2003*a*, YES), the master control module releases buffer set information etc. of the writing back subject buffer set (S2004*a*). The master control module refers to the buffer set management table 400, and sets a buffer set ID corresponding to a buffer set ID of the writing back subject buffer set to an unused state.

In S2005*a*, the master control module performs processing for optimizing the buffer threshold. Then, the master control module shifts the processing to S2006*a*, and ends the buffer save processing.

FIGS. 21 and 22 briefly illustrate specific examples of the writing back according to this embodiment. Reference sign 2101 in FIGS. 21 and 22 indicates the save buffer 118 in a simple manner. Reference signs 2102 to 2104 in FIGS. 21 and 22 indicate the buffer sets in a simple manner.

FIGS. 21 and 22 are illustrations explaining the writing back if the buffer threshold is 4 when the copy source apparatus 110 includes control modules #00 to #03, and each control module has 8 individual buffers.

A case is considered (a) in which buffer sets 1 to 4 are during transferring, waiting for completion of transferring, or waiting for releasing, and (b) in which a buffer set 5 is during writing back. In this case, (c) a buffer set 6 stores Write data.

Referring to FIG. 22, (d) when a region used by the buffer set 1 is released, the master control module updates the stage pointer information.

If the buffer set 5 is in the writing back, (e) since data is in the write only buffer 201 or the like, the writing back of the buffer set 5 is suspended, and the processing for transferring buffer set data in the buffer set 5 to the copy target apparatus 120 is started.

If the writing back of the buffer set 5 is completed, the staging is performed in which the buffer set data in the buffer set 5 is read out from the save buffer 118 and stored in the buffer set 1.

(7) Staging from Save Buffer 118 to Write Only Buffer 201

Figure 23A:
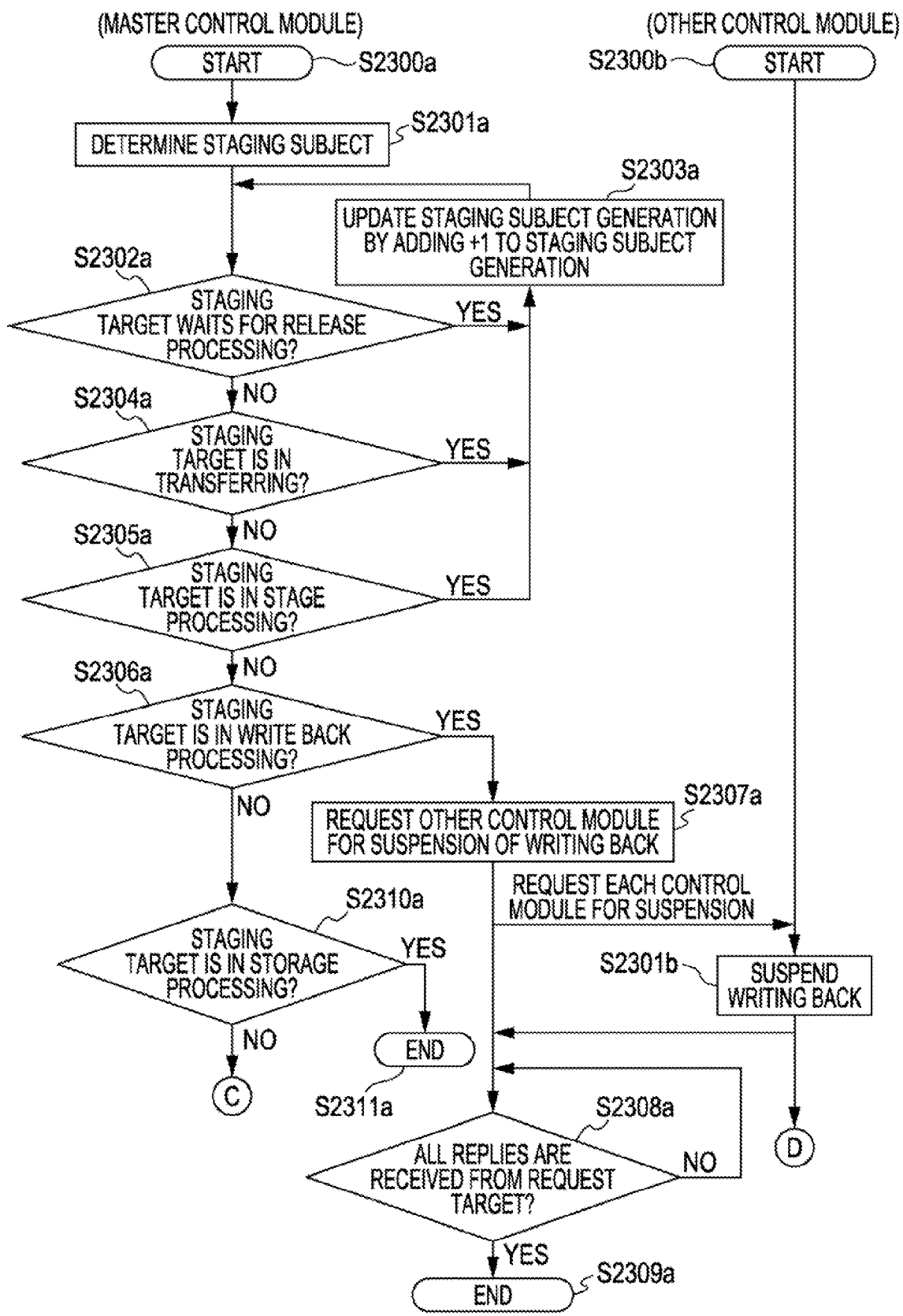
FIG. 23A is a flowchart illustrating staging.

FIGS. 23A and 23B are flowcharts briefly illustrating the staging according to this embodiment. The processing illustrated in FIGS. 23A and 23B specifically describes the processing in S1218*a* to S1220*a* illustrated in FIG. 12B.

In S2300*a*, if the release processing for the old generation is completed, the master control module in the copy source apparatus 110 shifts the processing to S2301*a*.

In S2301*a*, the master control module determines a generation subjected to the staging. For example, the master control module refers to the stage pointer information, increments the generation stored in the stage pointer information by 1, and newly determines the incremented generation as the generation subjected to the staging. The generation subjected to the staging is called "staging subject generation." In the processing illustrated in FIGS. 23A and 23B, a buffer set acquired in the processing in S1213*a* in FIG. 12B and used for the staging is called "staging target."

In S2302*a*, the master control module checks whether a region of the staging target of the staging subject generation waits for the release processing. If the region of the staging target waits for the release processing (S2302*a*, YES), the master control module shifts the processing to S2303*a*.

In S2303*a*, the master control module sets the generation obtained by adding 1 to the staging subject generation as a new staging subject generation. The master control module shifts the processing to S2302*a*.

In S2302*a*, if the region of the staging target does not wait for the release processing (S2302*a*, NO), the master control module shifts the processing to S2304*a*.

In S2304*a*, the master control module checks whether the staging target is during the transferring. If the staging target is in transferring (S2304*a*, YES), the master control module shifts the processing to S2303*a*.

In S2304*a*, if the staging target is not during the transferring (S2304*a*, NO), the master control module shifts the processing to S2305*a*.

In S2305*a*, the master control module checks whether the staging subject generation is during the staging. If the staging subject generation is during the staging (S2305*a*, YES), the master control module shifts the processing to S2303*a*.

In S2305*a*, if the staging subject generation is not during the staging (S2305*a*, NO), the master control module shifts the processing to S2306*a*.

In S2306*a*, the master control module checks whether the staging subject generation is during the writing back. If the staging subject generation is during the writing back (S2306*a*, YES), the master control module shifts the processing to S2307*a*.

In S2307*a*, the master control module suspends the writing back thereof, and requests the other control modules included in the copy source apparatus 110 for the suspension of the writing back.

In S2301*b*, when each of the other control modules receives the request from the master control module, the control module suspends the writing back. Then, the control module notifies completion of the suspension of the writing back to the master control module.

In S2308*a*, the master control module checks whether the master control module has received replies from all requested control modules. If there is a control module without a reply (S2308a, NO), the master control module repeats the processing in S2308a.

In S2308a, if the master control module has received the replies from all requested control modules (S2308a, YES), the master control module shifts the processing to S2309a, and ends the staging.

In S2306a, if the staging subject generation is not during the writing back (S2306a, NO), the master control module shifts the processing to S2310a.

In S2310a, the master control module checks whether the staging target is during the storage processing for Write data etc. If the staging target is during the storage processing (S2310a, YES), the master control module shifts the processing to S2311a, and ends the staging.

In S2310a, if the staging target is not during the storage processing for the Write data etc. (S2310a, NO), the master control module shifts the processing to S2312a.

In S2312a, the master control module checks whether the staging subject generation is already stored in the staging target acquired by the processing in S1213a in FIG. 12B.

If the staging subject generation is stored in the staging target (S2312a, YES), the master control module shifts the processing to S2316a, and ends the staging. If the staging subject generation is not stored in the staging target (S2316a, NO), the master control module shifts the processing to S2313a.

In S2313a, the master control module acquires the number of buffer sets used for the staging or transferring. The master control module compares the number of buffer sets used for the staging or transferring with the buffer threshold. If the number of buffer sets in use is the buffer threshold or larger (S2313a, YES), the master control module shifts the processing to S2317a, and ends the staging. If the number of buffer sets used for the staging or transferring is not the buffer threshold or larger (S2313a, NO), the master control module shifts the processing to S2314a.

In S2314a, the master control module stages the staging subject generation as follows.

The master control module calculates an address of an individual save buffer, which stores the staging subject generation, from the save buffer management table 500. The master control module acquires buffer data, a BIT, and buffer set information from the calculated address.

The master control module stores the acquired buffer data, the BIT, and the buffer set information in the buffer 201a, the BIT storage unit 201b, and the buffer set information storage unit 202, corresponding to the buffer set indicated by the staging subject buffer set ID. Similar processing is performed for each of the other control modules in the copy source apparatus 110.

If the save buffer assigned to the control module has a continuous address space, an address of the individual save buffer can be obtained by adding "(staging subject generation−1)×individual save buffer size" to "storage leading address of save data" set in the save buffer management table 500.

In S2315a, the master control module requests each of the other control modules to acquire a staging subject generation from the save buffer 118 and perform the staging like S2314a.

In S2302b, each of the other control modules stages the buffer set information and the BIT as follows.

Each of the control modules requested by the master control module acquires the BIT and the buffer set information of the staging subject generation that is requested from the master control module, from the individual save buffer in the save buffer 118 assigned to the control module.

Each of the other control modules stores the BIT and the buffer set information acquired from the individual save buffer of the save buffer 118, in the BIT storage unit 201b and the buffer set information storage unit 202 included in the control module.

In S2303b, each of the other control modules refers to the individual save buffer in the save buffer 118 assigned to the control module, and judges whether the individual save buffer has buffer data of the staging subject generation. If the individual save buffer in the save buffer 118 has the buffer data of the staging subject generation (S2303b, YES), the control module stages the buffer data (S2304b). When the staging is completed, the control module notifies the completion to the master control module. Then, the control module shifts the processing to S2305b, and ends the staging.

In S2303b, if the individual save buffer in the save buffer 118 does not have the buffer data of the staging subject generation (S2303b, NO), each of the other control modules notifies the completion to the master control module.

In S2316a, the master control module monitors the notification of the completion until the master control module receives replies from all requested control modules. If the master control module has received the replies from all requested control modules (S2316a, YES), the master control module shifts the processing to S2317a, and ends the staging.

(8) Processing for Optimizing Buffer Threshold

Figure 24:
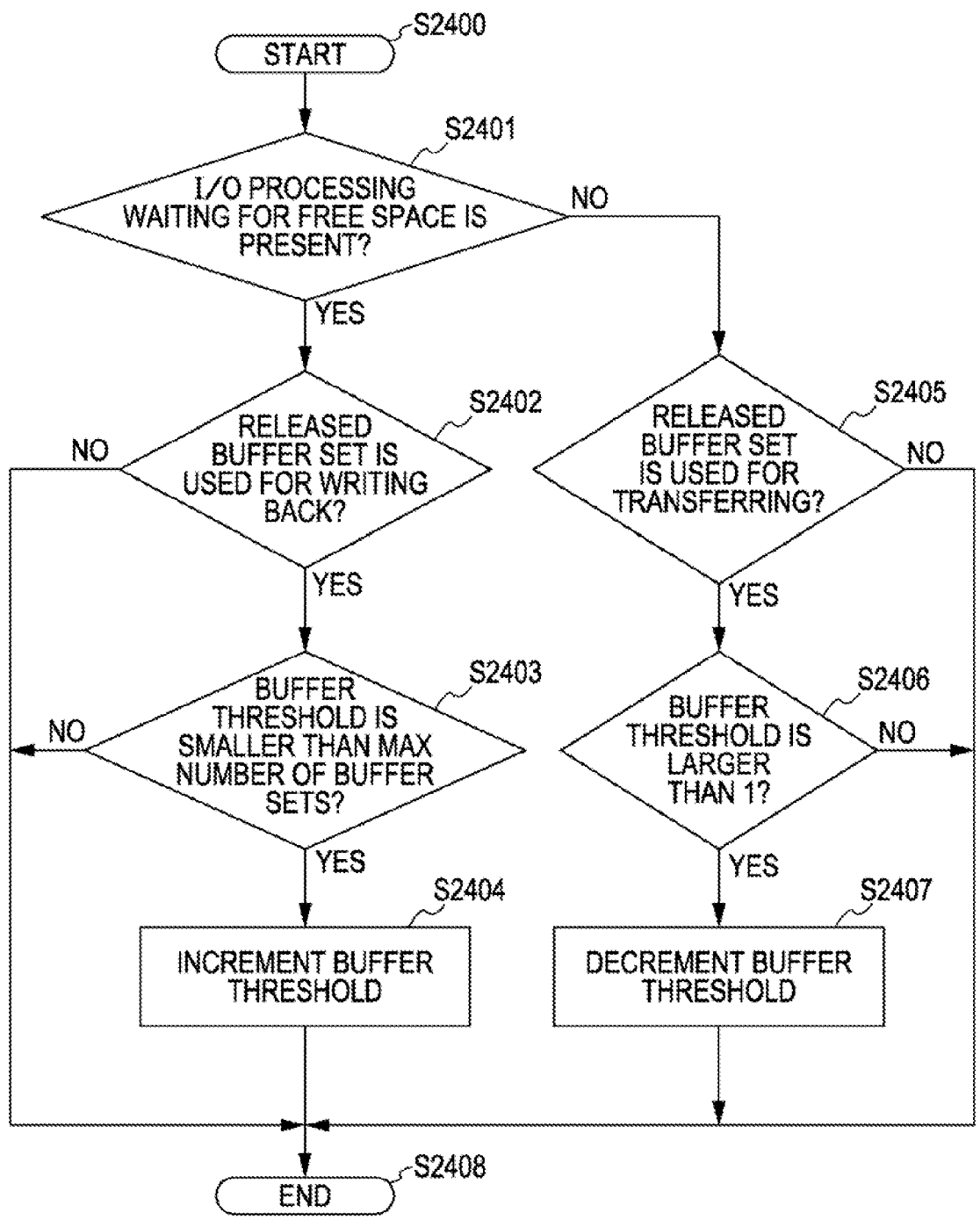
FIG. 24 is a flowchart illustrating optimization processing for a buffer threshold.

FIG. 24 is a flowchart illustrating the processing for optimizing the buffer threshold according to this embodiment.

When the processing is shifted to S1216a illustrated in FIG. 12B, or S2005a illustrated in FIG. 20, the master control module starts optimization processing for the buffer threshold (S2400).

In S2401, the master control module refers to a hold queue for managing Write I/O commands, and judges whether waiting Write I/O is present. If the waiting Write I/O is present (S2401, YES), the master control module shifts the processing to S2402.

In S2402, the master control module judges whether the released buffer set was used for the writing back. The "released buffer set" is a buffer set that has been released before the optimization processing illustrated in FIG. 24 is started, for example, a buffer set that has been released in S1214a illustrated in FIG. 12B or in S2004a illustrated in FIG. 20.

If the released buffer set was not used for the writing back (S2402, NO), the master control module shifts the processing to S2408, and ends the optimization processing for the buffer threshold. If the released buffer set was used for the writing back (S2402, YES), the master control module shifts the processing to S2403.

In S2403, the master control module acquires the buffer threshold from the buffer management table 300, and judges whether the buffer threshold is smaller than the maximum number of buffer sets. If the buffer threshold is the maximum number of buffer sets or larger (S2403, NO), the master control module shifts the processing to S2408, and ends the optimization processing for the buffer threshold.

If the buffer threshold is smaller than the maximum number of buffer sets (S2403, YES), the master control module shifts the processing to S2404. The master control module increments the buffer threshold by 1, and updates the buffer threshold in the buffer management table 300 (S2404). The master control module shifts the processing to S2408, and ends the optimization processing for the buffer threshold.

In S2401, if the waiting Write I/O is not present (S2401, NO), the master control module shifts the processing to S2405.

In S2405, the master control module judges whether the released buffer set was used for the transferring. Like S2402, the "released buffer set" is a buffer set that has been released before the optimization processing illustrated in FIG. 24 is started, for example, a buffer set that has been released in S1214a illustrated in FIG. 12B or in S2004a illustrated in FIG. 20.

If the released buffer set was not used for the transferring (S2405, NO), the master control module shifts the processing to S2408, and ends the optimization processing for the buffer threshold. If the released buffer set was used for the transferring (S2405, YES), the master control module shifts the processing to S2406.

In S2406, the master control module acquires the buffer threshold from the buffer management table 300, and judges whether the buffer threshold is larger than 1. If the buffer threshold is 1 or smaller (S2406, NO), the master control module shifts the processing to S2408, and ends the optimization processing for the buffer threshold.

If the buffer threshold is larger than 1 (S2406, YES), the master control module shifts the processing to S2407. The master control module decrements the buffer threshold by 1, and updates the buffer threshold in the buffer management table 300 (S2407). The master control module shifts the processing to S2408, and ends the optimization processing for the buffer threshold.

Figure 25:
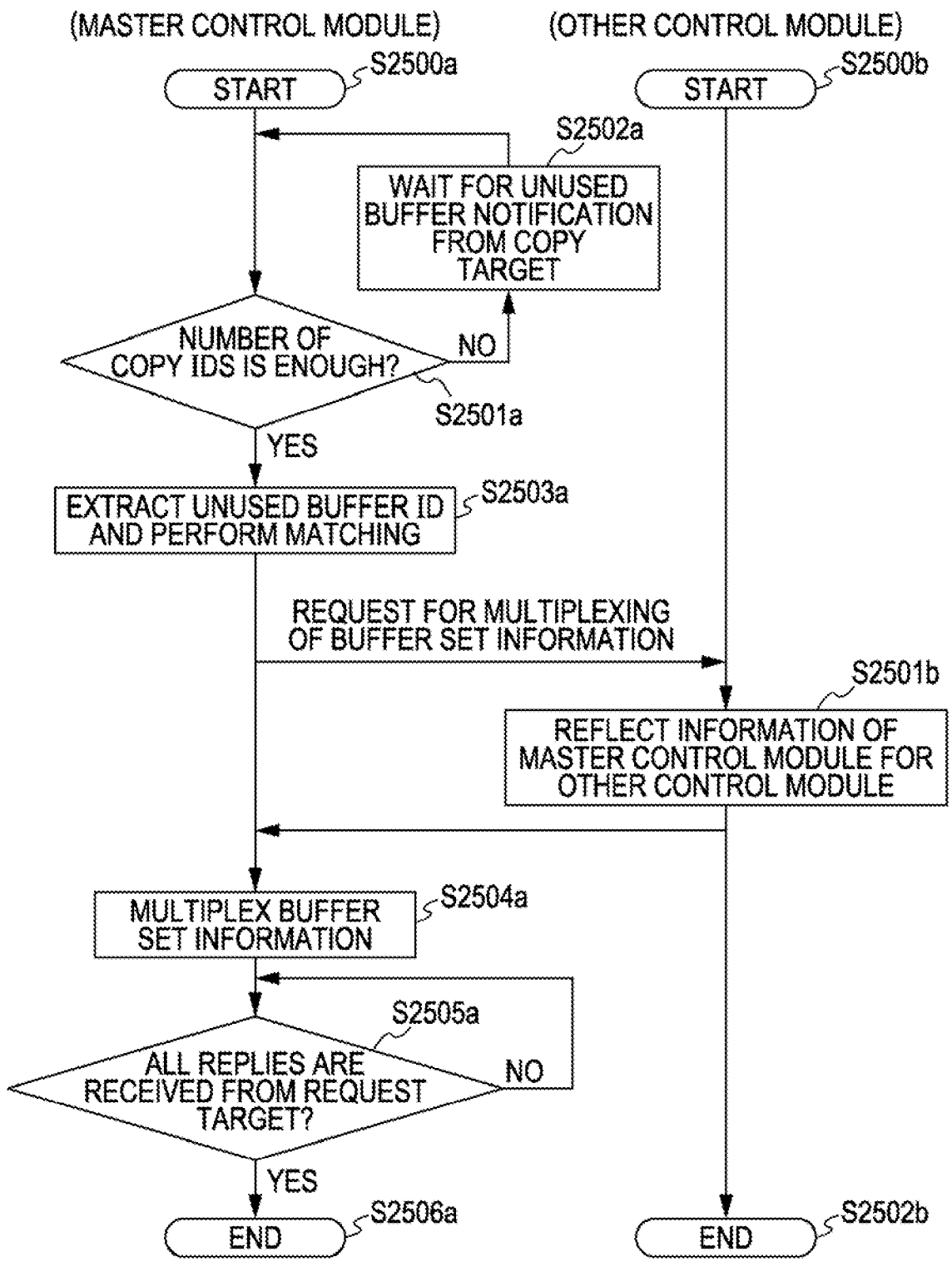
FIG. 25 is a flowchart illustrating specific processing of matching processing illustrated in FIG. 12B.

FIG. 25 is a flowchart illustrating specific processing of the matching processing (S1211a) illustrated in FIG. 12B. FIG. 25 illustrates specific processing for the master control module and the other control modules included in the copy source apparatus 110.

In S2501a, the master control module refers to the unused buffer ID storage unit 206. The master control module checks whether the number of unused buffer IDs stored in the unused buffer ID storage unit 206 is a number required for the matching with copy source IDs included in the buffer set information stored in the buffer set information storage unit 202.

In S2501a, if the required number of unused buffer IDs is not recognized (S2501a, NO), the master control module shifts the processing to S2502a. The master control module waits for unused buffer notification from the copy target apparatus 120 in S2502a. If the master control module receives the unused buffer notification, the master control module shifts the processing to S2501a.

In S2501a, if the required number of unused buffer IDs is recognized (S2501a, YES), the master control module shifts the processing to S2503a.

In S2503a, the master control module acquires the required number of unused buffer IDs from the unused buffer ID storage unit 206. The master control module associates copy target IDs included in the buffer set information stored in the buffer set information storage unit 202 with the acquired unused buffer IDs. That is, the control module performs the matching between the copy source buffer and the copy target buffer.

When the matching processing is ended, the master control module requests the other control modules to perform multiplexing the buffer set information.

In S2501b, when each of the other control modules receives the request for multiplexing the buffer set information from the master control module, the control module performs the multiplexing for the buffer set information. Herein, the multiplex processing for the buffer set information is processing for causing all control modules included in the copy source apparatus 110 or the copy target apparatus 120 to hold the same buffer set information.

For example, each of the other control modules acquires the buffer set information with the matching processing performed in S2503a from the master control module. Then, the control module reflects the acquired buffer set information to the buffer set information storage unit 202 included in the control module.

When the multiplex processing for the buffer set information in S2501b is ended, each of the other control modules notifies completion of the multiplex processing for the buffer set information to the master control module.

In S2505a, the master control module checks whether the master control module has received replies from all control modules requested for the multiplex processing for the buffer set information. If the master control module has received the replies from all control modules (S2505a YES), the master control module ends the processing for the assignment for the copy target buffer (S2506a), and shifts the processing to S1212a illustrated in FIG. 12B.

As described above, the copy source apparatus 110 according to this embodiment includes the save buffer 118.

If the number of buffer sets being used for the transferring or staging exceeds the buffer threshold, the copy source apparatus 110 performs the writing back in which the buffer set data is saved to the save buffer 118.

For example, when line performance between the copy source apparatus 110 and the copy target apparatus 120 is low and the copy source apparatus 110 receives Write I/O commands one after another from the host 150, if the number of buffer sets in use exceeds the buffer threshold, the copy source apparatus 110 saves the buffer set data to the save buffer 118.

When the copy source apparatus 110 completes the transfer and buffer copy processing for the buffer set data to the copy target apparatus 120, the copy source apparatus 110 releases the region, which stores the buffer set data, and stages the buffer set data which has been saved to the save buffer 118, into the released region. The copy source apparatus 110 transfers the buffer data to the copy target apparatus 120.

As described above, with the copy source apparatus 110 according to this embodiment, even if the transfer processing for data is delayed such as when the line performance between the copy source apparatus 110 and the copy target apparatus 120 is low, the shortage of a buffer set can be prevented from occurring. Thus, the copy target apparatus 120 can restrict buffer Halt processing that is performed when the shortage of a buffer set occurs. In particular, the copy target apparatus 120 can prevent the remote copy that ensures the ordering from being suspended because the contents in the buffer sets are cleared due to the buffer Halt processing. As a result, the copy source apparatus 110 can perform the remote copy that ensures the ordering even if the transfer processing for data is delayed.

A similar advantage can be attained even if the transfer processing for data is delayed such as when the line performance is not uniform and is unstable or when a data update amount by Write I/O etc. exceeds the capacity of the write only buffer 201 in the copy source apparatus 110.

The copy source apparatus 110 optimizes the buffer threshold in accordance with the load of processing resulted from the Write I/O processing.

For example, the copy source apparatus 110 decrements the buffer threshold if there is waiting Write I/O processing after the staging or transferring. If the waiting Write I/O processing frequently occurs, the buffer threshold is decremented every time when the waiting Write I/O processing is detected after the staging or transferring. Then, referring to FIG. 27, the buffer threshold varies, and the number of buffer sets used for the writing back increases.

As a result, if the frequency of the Write I/O processing rapidly increases, the buffer set data is saved to the save buffer 118. The shortage of a buffer set can be prevented from occurring.

For example, the copy source apparatus 110 increments the buffer threshold if there is no waiting Write I/O processing after the execution of the write back processing for the buffer set data. If a state in which the waiting Write I/O processing is not detected continues, the copy source apparatus 110 increments the buffer threshold every time when the transfer processing for the buffer set data is executed. Then, referring to FIG. 26, the buffer threshold varies, and the number of buffer sets for the staging or transferring increases.

As a result, the transfer processing for the buffer set data is performed by maximally using the bandwidth of the communication line. The transfer processing for the buffer set data increases, and the shortage of a buffer set can be prevented from occurring.

Figure 26:
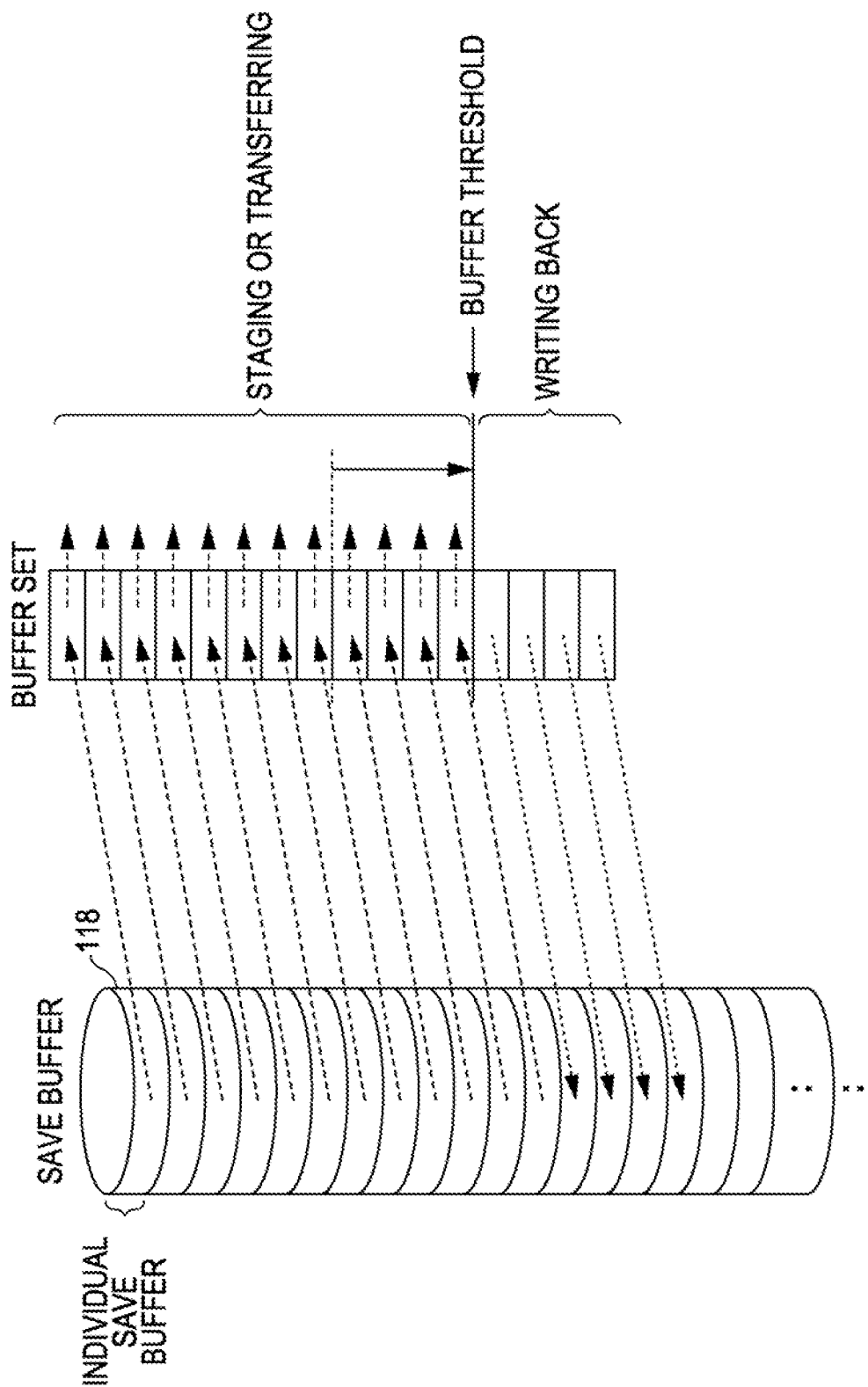
FIG. 26 is an illustration explaining optimization for a buffer threshold.
Figure 27:
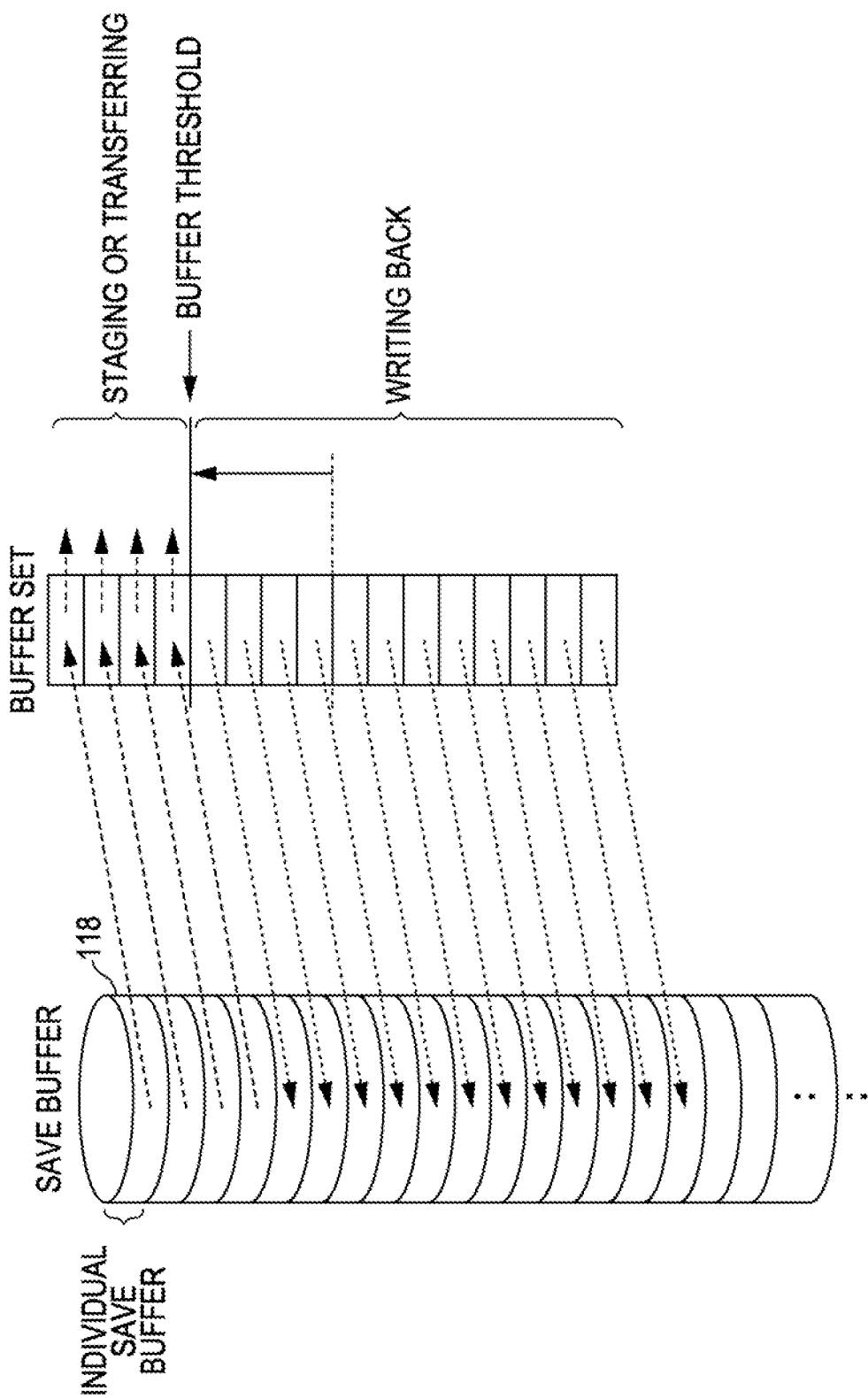
FIG. 27 is an illustration explaining optimization for a buffer threshold.
Figure 28:
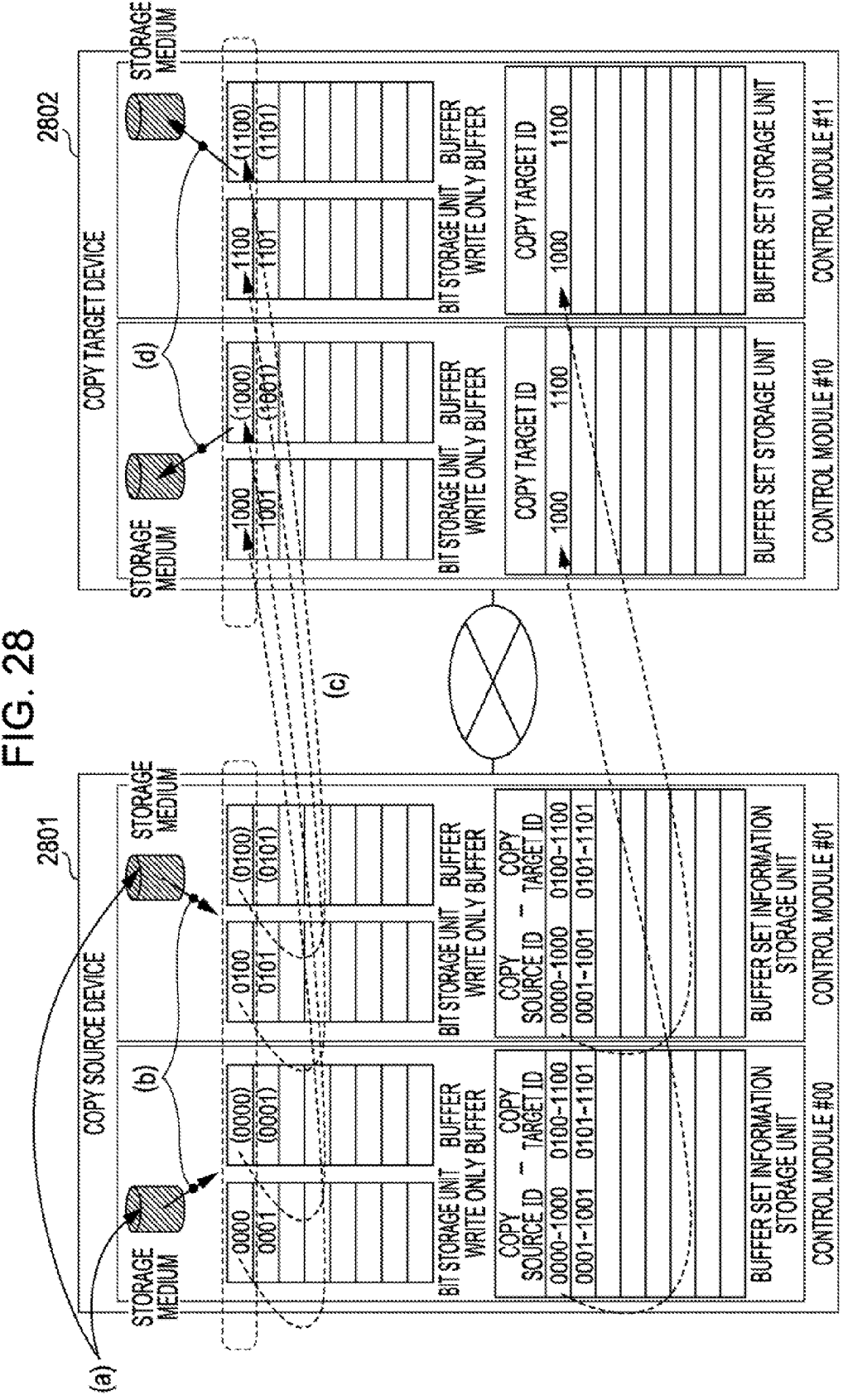
FIG. 28 is an illustration explaining a RAID apparatus having a remote copy function that ensures ordering.
Figure 29:
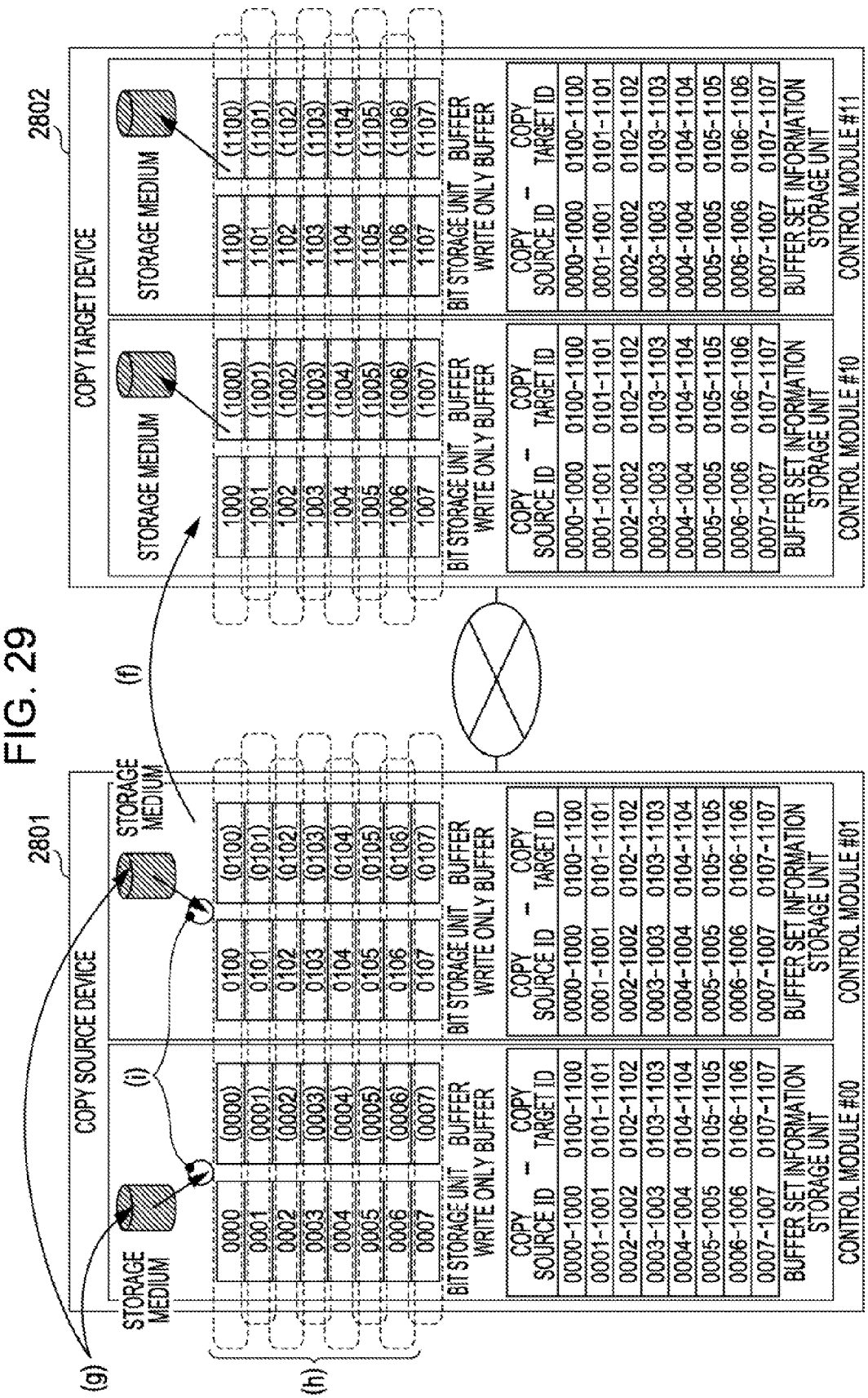
FIG. 29 is an illustration explaining a RAID apparatus having a remote copy function that ensures ordering.

FIGS. 26 and 27 illustrate the number of buffer sets being 16 instead of 8 for easier understanding of the operation of the buffer threshold. Hence, the configuration of the buffer sets is not limited to that illustrated in FIGS. 26 and 27.

In conventional remote copy processing, matching processing between copy source IDs and copy target IDs is performed when buffer set information is generated. However, in the remote copy processing according to this embodiment, the matching processing is not performed in S1202a, but is performed immediately before the transfer processing after completion of the storage processing to the buffer (S1211a).

Thus, the storage processing for data can be performed simultaneously with the transfer processing for buffers other than buffers relating to the transfer processing. All buffers including the write only buffers 201 and the buffer set information storage units 202 in the copy source apparatus 110 can be efficiently used. For example, data relating to Write I/O from the host 150 can be stored until the capacity of the buffers in the copy source apparatus 110 is used up.

As a result, regarding the buffers to be used for the remote copy that ensures the ordering, even if the buffers included in the copy target apparatus 120 is fewer than the buffers included in the copy source apparatus 110, the buffers in the copy source apparatus 110 can be effectively used.

Also, if the copy source apparatus 110 and the copy target apparatus 120 are disconnected from one another, for example, because a certain trouble occurs in the network therebetween, Write data can be stored as much as possible unless the capacity of the buffers in the copy source apparatus 110 is used up. Thus, as long as the disconnected state is addressed before the buffers are used up, the remote copy processing that ensures the ordering does not have to be suspended. As a result, reliability and stability of the remote copy processing can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A storage apparatus connected to a storage device, comprising:
    a storage module;
    a memory having a plurality of areas to store data to be copied to the storage device;
    a saving buffer to temporarily store the data stored in the plurality of areas; and
    a processor to execute:
        receiving a write request including the data to be stored in the storage apparatus from an external device,
        storing the data included in the write request to the storage module,
        storing the data included in the write request to one of the plurality of areas,
        copying the data stored in the one of the plurality of areas to the storage device when a number of the plurality of areas being copied is less than a threshold value, and saving the data stored in the one of the plurality of areas to the saving buffer when the number of the plurality of areas being copied is not less than the threshold value,
        writing the saved data to be copied from the memory to the storage device and having been stored in the saving buffer from the one of the plurality of areas by the saving, to any one of the plurality of areas of the memory when the number of the plurality of areas being copied is less than the threshold value, and
        determining the threshold value in accordance with an amount of the write request.

2. The storage apparatus according to claim 1, wherein when the processor receives a plurality of the write requests, the processor copies the data so as to ensure an order of the received write requests.

3. The storage apparatus according to claim 2, wherein the processor writes the saved data stored in the saving buffer to the one of the plurality of areas when the data to be copied next is the saved data.

4. The storage apparatus according to claim 1, wherein the threshold value is greater than one.

5. The storage apparatus according to claim 1, wherein an upper limit of the threshold value is determined from a bandwidth available for a network connecting the storage apparatus with the storage device.

6. The storage apparatus according to claim 5, wherein the processor determines the threshold value which is not more than the upper limit.

7. The storage apparatus according to claim 1, wherein the processor executes the writing to copy the save data from the any one of the plurality of areas to the storage device.

8. The storage apparatus according to claim 1, wherein the processor executes the copying so as to copy the data stored in the one of the plurality of areas to the storage device without saving the data stored in the one of the plurality of areas to the saving buffer when a number of the plurality of areas being copied is less than the threshold value.

9. A method being executed by a processor included in a storage apparatus connected to a storage device, the method comprising:
    receiving, by the processor, a write request including data to be stored in the storage apparatus from an external device;
    storing, by the processor, the data included in the write request to a storage module included in the storage apparatus;
    storing, by the processor, the data included in the write request to one of a plurality of areas of a memory, the memory included in the storage apparatus, the memory having the plurality of areas storing the data to be copied to the storage device;

copying, by the processor, the data stored in the one of the plurality of areas to the storage device when a number of the plurality of areas being copied is less than a threshold value;

saving, by the processor, the data stored in the one of the plurality of areas to a saving buffer when the number of the plurality of areas being copied is not less than the threshold value, the saving buffer for temporarily saving the data stored in the plurality of areas;

writing, by the processor, the saved data to be copied from the memory to the storage device and having been stored in the saving buffer from the one of the plurality of areas by the saving, to any one of the plurality of areas of the memory when the number of the plurality of areas being copied is less than the threshold value; and determining, by the processor, the threshold value in accordance with an amount of the write request.

10. The method according to claim 9, when the receiving receives a plurality of the write requests, the copying copies the data so as to ensure an order of the received write requests.

11. The method according to claim 10, wherein the writing writes the saved data stored in the saving buffer to the one of the plurality of areas when the data to be copied next is the saved data.

12. The method according to claim 9, wherein the threshold value is greater than one.

13. The method according to claim 9, further comprising determining an upper limit of the threshold value from a bandwidth available for a network connecting the storage apparatus with the storage device.

14. The method according to claim 13, wherein the determining the threshold value determines the threshold value which is not more than the upper limit.

15. The method according to claim 9, wherein the processor executes the writing to copy the save data from the any one of the plurality of areas to the storage device.

16. The method according to claim 9, wherein the copying is executed by the processor so as to copy the data stored in the one of the plurality of areas to the storage device without saving the data stored in the one of the plurality of areas to the saving buffer when a number of the plurality of areas being copied is less than the threshold value.

* * * * *